United States Patent
Minelli

(10) Patent No.: US 6,871,138 B1
(45) Date of Patent: Mar. 22, 2005

(54) RUGGED, WATERPROOF, NAVIGATION DEVICE WITH TOUCH PANEL

(75) Inventor: Jeffrey D. Minelli, Olathe, KS (US)

(73) Assignee: Garmin Ltd. (KY)

( * ) Notice: Subject to any disclaimer, the term of this patent is extended or adjusted under 35 U.S.C. 154(b) by 0 days.

(21) Appl. No.: 10/792,104

(22) Filed: Mar. 3, 2004

Related U.S. Application Data

(63) Continuation of application No. 10/185,604, filed on Jun. 28, 2002, now Pat. No. 6,721,651.

(51) Int. Cl.$^7$ ............................................. G01C 21/26
(52) U.S. Cl. ....................... 701/200; 345/173; 345/104; 345/3.1; 156/66; 156/99; 361/681; 361/683; 349/60; 174/50.51; 174/50.54; 174/35 GC
(58) Field of Search ..................... 701/200; 345/173, 345/104, 3.1; 156/66, 99; 361/681, 683; 349/60; 174/50.51, 50.54, 35 GC

(56) References Cited

U.S. PATENT DOCUMENTS

| | | | |
|---|---|---|---|
| 4,811,613 A | 3/1989 | Phillips et al. ............. 74/5.6 D |
| 4,831,563 A | 5/1989 | Ando et al. ............. 364/571.05 |
| 4,924,402 A | 5/1990 | Ando et al. .................. 364/449 |
| 5,149,919 A * | 9/1992 | Greanias et al. ......... 178/18.02 |
| 5,220,509 A | 6/1993 | Takemura et al. .......... 364/449 |
| 5,331,563 A | 7/1994 | Masumoto et al. ......... 342/457 |
| 5,349,530 A | 9/1994 | Odagawa .................... 364/449 |
| 5,363,306 A | 11/1994 | Kuwahara et al. .......... 364/449 |
| 5,396,430 A | 3/1995 | Arakawa et al. ............ 364/449 |
| 5,424,953 A | 6/1995 | Masumoto et al. ......... 364/449 |
| 5,506,774 A | 4/1996 | Nobe et al. ............. 364/424.05 |
| 5,657,231 A | 8/1997 | Nobe et al. .............. 364/449.3 |
| 5,742,925 A | 4/1998 | Baba .......................... 701/221 |
| 5,852,791 A | 12/1998 | Sato et al. .................. 701/217 |
| 5,862,511 A | 1/1999 | Croyle et al. ............... 701/213 |
| 5,890,092 A | 3/1999 | Kato et al. .................. 701/216 |
| 6,067,133 A * | 5/2000 | Niibori et al. ................ 349/60 |
| 6,353,798 B1 | 3/2002 | Green et al. ................ 701/213 |
| 6,356,259 B1 * | 3/2002 | Maeda et al. ............... 345/173 |
| 6,374,177 B1 | 4/2002 | Lee et al. .................... 701/200 |
| 6,374,179 B1 | 4/2002 | Smith et al. ................ 701/207 |
| 6,507,337 B1 * | 1/2003 | Sato et al. ................... 345/173 |
| 6,532,152 B1 * | 3/2003 | White et al. ................ 361/692 |
| 6,538,880 B1 * | 3/2003 | Kamijo et al. .............. 361/686 |
| 6,542,824 B1 * | 4/2003 | Berstis ........................ 701/220 |
| 2002/0011951 A1 * | 1/2002 | Pepin et al. ............ 342/357.13 |
| 2002/0151994 A1 * | 10/2002 | Sisco .......................... 700/91 |
| 2002/0152025 A1 * | 10/2002 | Shimada ..................... 701/209 |

* cited by examiner

Primary Examiner—Thomas G. Black
Assistant Examiner—Ronnie Mancho
(74) Attorney, Agent, or Firm—Devon A. Rolf

(57) ABSTRACT

An electronic device includes a housing, a processor located within the housing and a memory in communication with the processor. The electronic device includes a display in communication with the processor and a touch panel positioned on a surface of the housing. The display is viewable through a touch panel mounted to an opening in the housing. The housing includes a flange around the opening which has a fluid seal to prevent fluid flow past the touch panel and into the housing. A shock mount may also be included within the housing to make the touch panel drop-resistant.

28 Claims, 14 Drawing Sheets

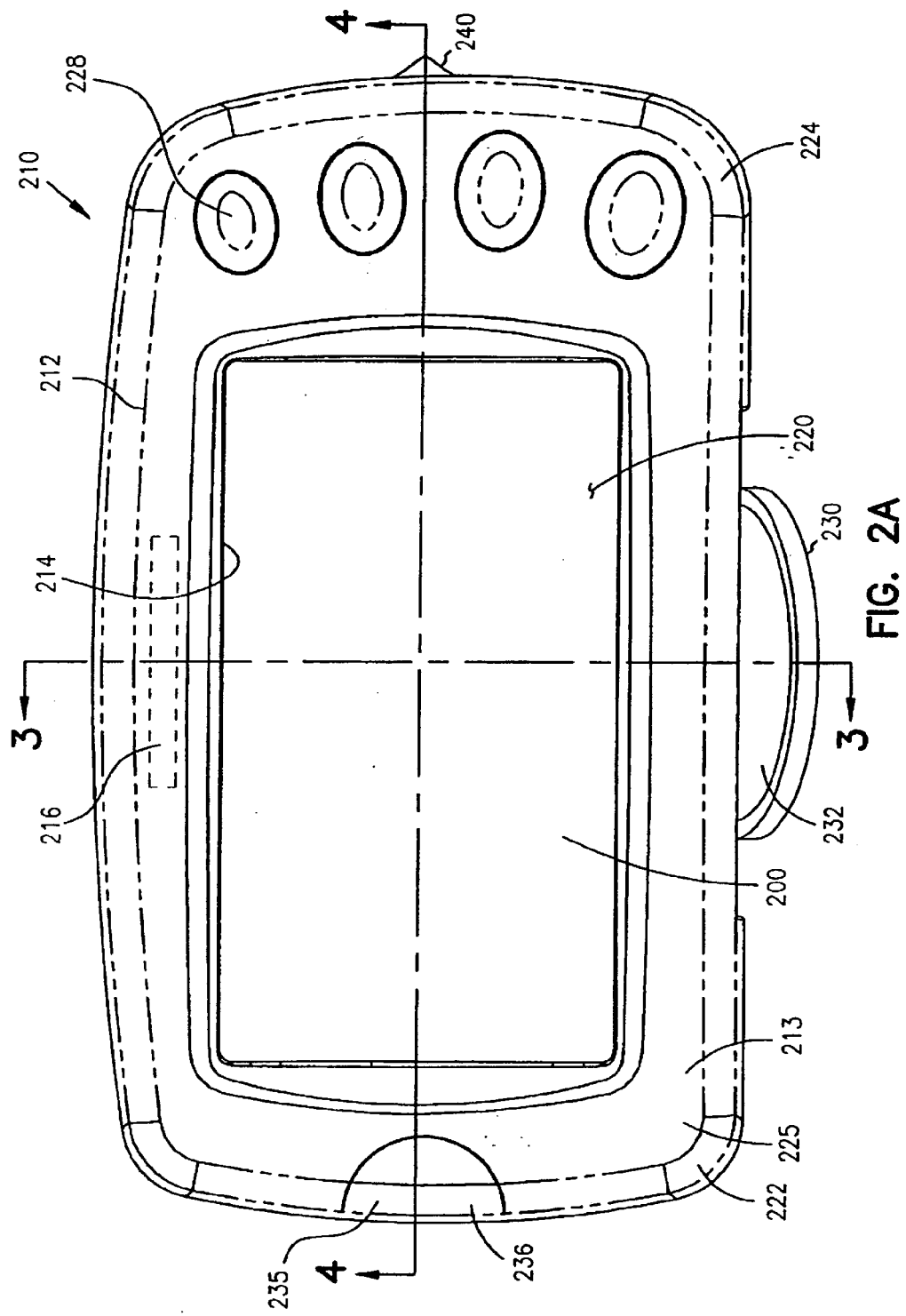

RUGGED, WATERPROOF, NAVIGATION DEVICE WITH TOUCH PANEL

RELATED APPLICATIONS

The present application is a Continuation of and claims priority benefit of U.S. patent Application Ser. No. 10/185,604, filed Jun. 28, 2002, titled "RUGGED, WATERPROOF, NAVIGATION DEVICE WITH TOUCH PANEL", now U.S. Pat. No. 6,721,651, which is incorporated herein by reference.

FIELD OF THE INVENTION

The present invention relates generally to navigational devices, and in particular to navigational devices which are both waterproofed and ruggedized.

BACKGROUND OF THE INVENTION

A natural progression in devices is to build more function or even to combine more functions into one device. In the past ten years, for example, mobile communications, personal data assistants, and portable navigational devices have become very popular. These devices have moved from desktop computers to hand-held devices. Personal data assistants ("PDA") are also exceedingly popular. The first PDA-type devices merely held a listing of contacts and may have had a calendar function. Now PDAs, in addition to holding contact data and a calendar, hold e-mail. PDAs have now been provided with the capability to respond to e-mail and are linked or synchronized with a computer periodically so any e-mail answers can be ported over to a computer for sending. Calendar changes are also synchronized.

Navigational devices represent yet another technology that has boomed as of late and which is now becoming popular and affordable. Previously, navigational devices were expensive and far from portable or hand-held. Most navigational devices could only be found on ships and airplanes. Now, navigational devices are popular options in luxury cars and navigational devices have become popular with outdoorsman of all types. Fisherman have them to mark out their favorite fishing holes, for example. These devices have also been combined with other devices, such as depth finders or fish finders which are popular with anglers.

Recently, PDAs and navigational devices, such as global positioning systems ("GPS"), have been combined. There are problems with such combined devices. For example, current combination devices which include a PDA and a GPS are confusing to use. One of the more confusing aspects is switching between the software applications needed for the GPS and the software applications needed for the PDA.

When navigational devices or PDAs were first introduced, problems associated with using these device outdoors were generally not contemplated. The cost and size of the navigational device all but prohibited one from using the navigational device outdoors. PDAs were generally used in office environments. Escaping to the outdoors generally meant leaving your PDA inside. Such devices were not waterproofed and not ruggedized.

The size reduction and lesser cost of the navigational devices and the combination navigational devices and PDAs now make outdoor use more common. As a result, the device must be ruggedized to accommodate outdoor use. The navigational device must be made waterproof as well as drop-resistant so that the device can withstand the rigors associated with such use. A device that combines uses, such as a combination PDA and navigational device, must also be made waterproof and drop-resistant. Making these devices waterproof and drop-resistant also is necessary as many users do not exercise care when handling such devices. It seems that as the cost goes down, so does the amount of care one uses in handling a device. Making such a device waterproof and drop-resistant will lessen the number of returns from users in the field. In addition, more rugged devices generally will have a market advantage. A consumer is more likely to pay a premium for a rugged, more dependable device.

SUMMARY OF THE INVENTION

An electronic device includes a housing, a processor located within the housing and a memory in communication with the processor. The electronic device includes a display in communication with the processor and positioned on a surface of the housing. The display is viewable through a touch panel mounted to an opening in the housing. The housing includes a flange around the opening which has a fluid seal to prevent fluid flow past the touch panel and into the housing. A shock mount may also be included within the housing to make the touch panel drop-resistant. The electronic device includes a navigational component having an instruction set for controlling the processor and memory to perform a route calculation. The electronic device may also communicate with a mass storage device adapted to store navigation data and a server adapted to communicate with the mass storage. The electronic device may also be multifunctional and, in some embodiments, includes cell phone or PDA capabilities.

A typical touch panel, in a hand-held electronic device, has a rigid material layer and a flexible layer. The rigid material layer and flexible material layer are held together in spaced relation by a gasket of double adhesive tape. A major surface of the rigid material and a major surface of the flexible material are provided with an electrically conductive film so that when the flexible material is deflected to touch the rigid material a closed circuit indicating the location of the contact is formed. A mounting member circumscribes the opening in the housing. The mounting member has a pocket for holding an adhesive. The adhesive is applied about the periphery of the touch panel. In one embodiment the adhesive is a flexible adhesive. In other embodiments the adhesive is rigid. Either adhesive may be curable using an ultraviolet light. In some embodiments, the hand-held electronic device is provided with a shock absorbing member, such as a layer foam or other viscoelastic material. In still other embodiments, the device includes a backing member that fits within the housing. The backing member has a portion positioned near the layer of rigid material of the touch panel. The shock absorbing member includes a portion which is sandwiched between the backing member and the layer of rigid material of the touch panel. In some embodiments, the shock absorbing member also includes a portion which is sandwiched between the flexible member of the touch panel and the mounting member. The mounting member is molded with or integral with the housing. In still other embodiments, a fluid seal is also provided. The fluid seal can include a gasket.

The hand-held electronic device includes a navigational component. The hand-held electronic device includes a processor located within the housing, and a memory in communication with the processor. The touch panel is in communication with the processor and the memory. The processor and memory is capable of performing a route calculation viewable on the display. The shock mount includes viscoelastic material which serves as a shock absorbing member.

The portable, hand-held device may also be part of a navigation system which includes a mass storage device adapted to store navigation data, a server adapted to communicate with the mass storage, and the electronic device. The device includes an antenna within the housing for communicating with the server. The antenna is situated on the top portion of the housing. The electronic device includes a navigation device adapted to perform a route calculation based on instructions from an instruction set for controlling the processor and memory to perform the route calculation. At least a portion of the instruction set resides within the processor and memory. In some embodiments, a portion of the instruction set is transmitted to the portable, multi-function electronic device from the server. In some embodiments, the link is an optoelectrical communication link.

Advantageously, the invention provides for a device which can now be used outdoors. Even though all uses will not be outdoors, all users will benefit by having a more dependable, rugged device. The navigational device is waterproof. The touch panel and more specifically, the rigid portion of the touch panel, typically made of glass or plastic is more drop-resistant so that the device can withstand the rigors associated with outdoor use. Since the devices are waterproof and dropresistant, the consumer market will perceive the device as more rugged and reliable and consumers will be more likely to pay a premium for the device. The number of returns from users in the field will also be less since the device is waterproof and drop-resistant.

These and other embodiments, aspects, advantages, and features of the present invention will be set forth in part in the description which follows, and in part will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claims.

BRIEF DESCRIPTION OF THE DRAWINGS

FIG. 2A illustrates a front view of an embodiment of a hand-held, electronic device that includes a navigation component;

DETAILED DESCRIPTION OF THE INVENTION

Figure 1:
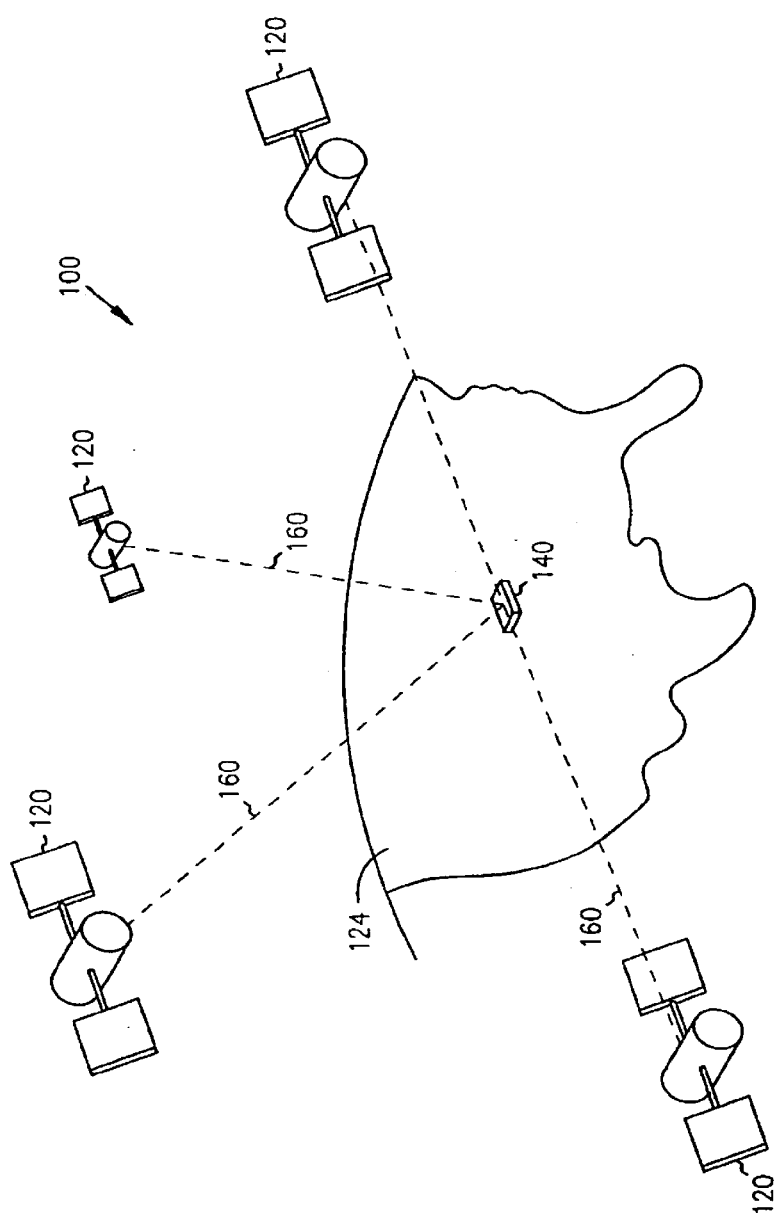
FIG. 1 is a representative view of a Global Positioning System (GPS)

In the following detailed description of the invention, reference is made to the accompanying drawings which form a part hereof, and in which is shown, by way of illustration, specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense, and the scope of the present invention is defined only by the appended claims, along with the full scope of equivalents to which such claims are entitled.

The following description and figures use a reference numeral convention where the first digit of the reference numeral corresponds to the figure and the following two digits correspond to like elements throughout the specification. For example, the housing of a portable, hand-held, electronic device of the present invention has a reference number of 212, 312, 412, 512 etc., corresponding to the housing X12 in FIGS. 2, 3, 4, 5, etc. where X is the number of the figure in which the reference numeral appears.

One type of navigational system includes Global Positioning Systems (GPS). Such systems are known and have a variety of uses. In general, GPS is a satellite-based radio navigation system capable of determining continuous position, velocity, time, and in some embodiments, direction information for an unlimited number of users. Formally known as NAVSTAR, the GPS incorporates a plurality of satellites which orbit the earth in extremely precise orbits. Based on these precise orbits, GPS satellites can relay their location to any number of receiving units.

The GPS system is implemented when a device specially equipped to receive GPS data begins scanning radio frequencies for GPS satellite signals. Upon receiving a radio signal from a GPS satellite, the device can determine the precise location of that satellite via one of different conventional methods. The device will continue scanning for signals until it has acquired at least three different satellite signals. Implementing geometrical triangulation, the receiver utilizes the three known positions to determine its own two-dimensional position relative to the satellites. Additionally, acquiring a fourth satellite signal will allow the receiving device to calculate its three-dimensional position by the same geometrical calculation. The positioning and velocity data can be updated in real time on a continuous basis by an unlimited number of users.

In fact, although GPS enabled devices are often used to describe navigational devices, it will be readily appreciated that satellites need not be used at all to determine a geographic position of a receiving unit, since cellular towers or any customized transmitting radio frequency towers can be deployed and combined in groups of three or more. With such a configuration, any standard geometric triangulation algorithm can be used to determine the exact location of the receiving unit. In this way, personal hand-held devices, cell phones, intelligent appliances, intelligent apparel, and others can be readily located geographically, if appropriately equipped to be a receiving unit.

FIG. 1 shows one representative view of a GPS denoted generally by reference numeral 100. A plurality of satellites 120 are in orbit about the Earth 124. The orbit of each satellite 120 is not necessarily synchronous with the orbits of other satellites 120 and, in fact, is likely asynchronous. A device that includes a GPS receiver 140 of the present invention is shown receiving spread spectrum GPS satellite signals 160 from the various satellites 120.

The spread spectrum signals 160 continuously transmitted from each satellite 120 utilize a highly accurate frequency standard accomplished with an extremely accurate atomic clock. Each satellite 120, as part of its data signal transmission 160, transmits a data stream indicative of that particular satellite 120. It will be appreciated by those skilled in the relevant art that the Device that includes a GPS receiver 140 must acquire spread spectrum GPS satellite signals 160 from at least three satellites 120 for the Device that includes a GPS receiver 140 to calculate its two-dimensional position by triangulation. Acquisition of an additional signal 160, resulting in signals 160 from a total of four satellites 120, permits Device that includes a GPS receiver 140 to calculate its three-dimensional position.

Of course as previously presented and as is readily appreciated by those skilled in the art, GPS satellites and GPS receiving devices are not required by the tenets of the present invention, since any receiving device capable or receiving the location from at least three transmitting locations can perform basic triangulation calculations to determine the relative position of the receiving device with respect to the transmitting locations.

For example, at least three cellular towers can each transmit their location information to a receiving cellular phone, or any other receiving device, and if the phones or devices are equipped to perform the triangulation algorithm, then the location of the cellular phone or device can be readily resolved. By further way of example, an amusement park or entertainment facility can deploy three or more transmitting radio frequency devices and provide users with receiving units capable of performing a triangulation algorithm to determine the receiving units location within the amusement park or entertainment facility. In this way, it is readily apparent that a receiving unit need not be exclusively GPS enabled to benefit from the teachings of the present invention.

FIG. 2A illustrates a front view of an electronic navigational device 210 according to the teachings of the present invention. FIG. 2A illustrates the top surface of the navigational device 210. In some embodiments, the navigational device 210 shown in FIG. 2A can include other functions, such as a personal digital assistant ("PDA") computing capability or cellular transceiver. The GPS navigational device 210 operates with an operating system ("OS") such as, for example, the well-known Palm or Pocket PC operating systems, the lesser-used Linux OS or a proprietary OS. The hand-held, electronic, navigational device 210 includes a housing 212 having an opening 214 therein. Within the housing 212 is a GPS patch antenna 216 (which is shown in phantom in FIG. 2A). In the embodiment shown in FIG. 2A, the antenna includes a patch antenna located on a top portion of the display. The housing 212 is generally rectangular with a low profile and has a display 200 viewable through the opening 214. A touch panel 220 is positioned within the opening 214. The touch panel 220 is transparent, the touch panel 220 is mounted within the opening and the display 200 is viewable through the touch panel 220 and the opening 214. The touch panel 220 is touch sensitive and can be responsive to a user's digit or a stylus. It should be noted that the display 200 is not limited to any particular type of display. The housing 212 has a first end 222 and a second end 224. The navigational device 210 includes a number of control buttons, or input keys 228 positioned toward one edge or end 224. The invention, however, is not so limited by the position of the control buttons 228. It should be noted that the input keys 228 can be positioned toward another edge or at any other suitable location on the housing 212. The housing may have various slots, jack openings, and could be provided with cards for various purposes. The openings or slots provided are assembled within the housing so as to eliminate potential leakage paths. On another edge or end 225 of the housing 212 there is an infrared data port 235 ("IRDA"). In the embodiment shown in FIG. 2A, the IRDA is positioned within a molded opening in the housing 212 and covered with a data port cover 236.

Also attached to the exterior of the housing 212 is a molded plate 230. The plate 230 includes an inclined surface 232 which engages a corresponding slot of a receptacle (not shown). The receptacle may be attached to the dashboard of a vehicle. The plate 230 slips within a corresponding slot of the receptacle to temporarily mount the housing 212 to the dashboard. The circular shape of the plate 230 allows the user to turn the device 210 to any desired position so that the user can more easily view the display 200, reach the control buttons 228, or actuate the touch panel 220. The receptacle engages the plate 230 with sufficient force to retain the hand-held, electronic device 210 in position during operation of the vehicle. In other words, the receptacle will hold the hand-held, electronic device 210 as the vehicle vibrates during normal operation or encounters bumps. The user can remove the hand-held, electronic device 210 when the vehicle is not in use. This lessens the potential that thieves may break into the vehicle to steal the hand-held, electronic device 210. Furthermore, in some embodiments, the hand-held, electronic device 210 is operable when hand-held so that the user may use the hand-held, electronic device 210 in another vehicle or while outdoors in a rural or in an urban area. Some embodiments of the device 210 include batteries.

It should be understood that the structure shown is of a navigational unit having a GPS. Other physical features and functionality, such as a cellular telephone, or a PDA, could be included with the GPS navigational device and are contemplated as within the scope of this invention.

Figure 2B:
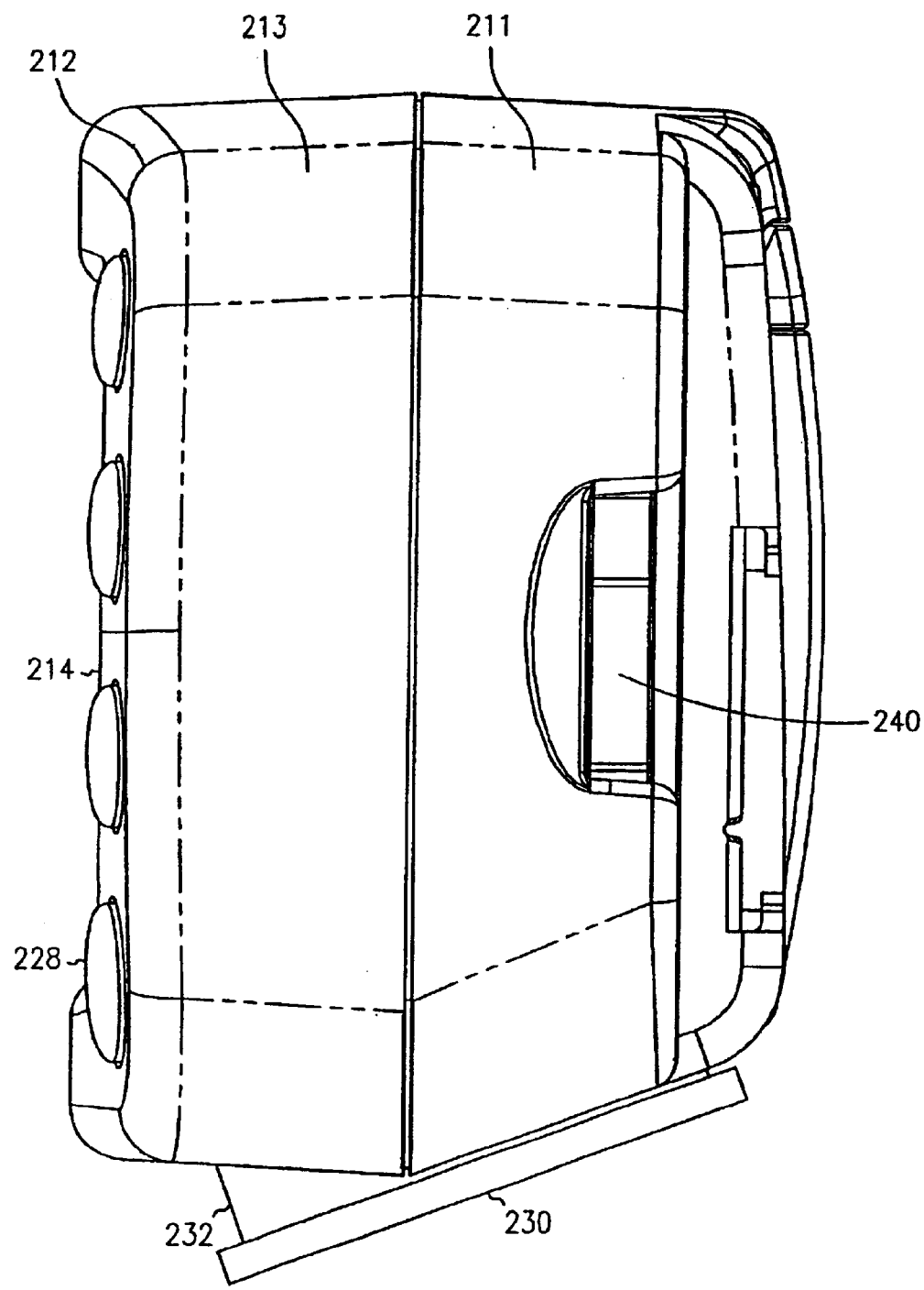
FIG. 2B illustrates a end of the embodiment of a hand-held, electronic device shown in FIG. 2A.

FIG. 2B illustrates an end of the embodiment of a hand-held, electronic device 210 shown in FIG. 2A. The housing 212 includes a first half 211 and a second half 213. The opening 214 for the display 200 is in the second half 213 of the housing 212. The touch panel 220 is mounted within the opening 214. The first half 211 and the second half 213 are sealed with respect to one another. Also shown in FIG.

2B is a sealed two position power switch 240 in the first half 211 of the housing 212. The power switch 240 is sealed so that moisture on the exterior surface of the housing 212 does not leak into the interior of the housing. The opening associated with the power switch is molded within the housing 212 and specifically within the first half 211 of the housing 212 to prevent a leakage path from the exterior to the interior of the housing.

Figure 2C:
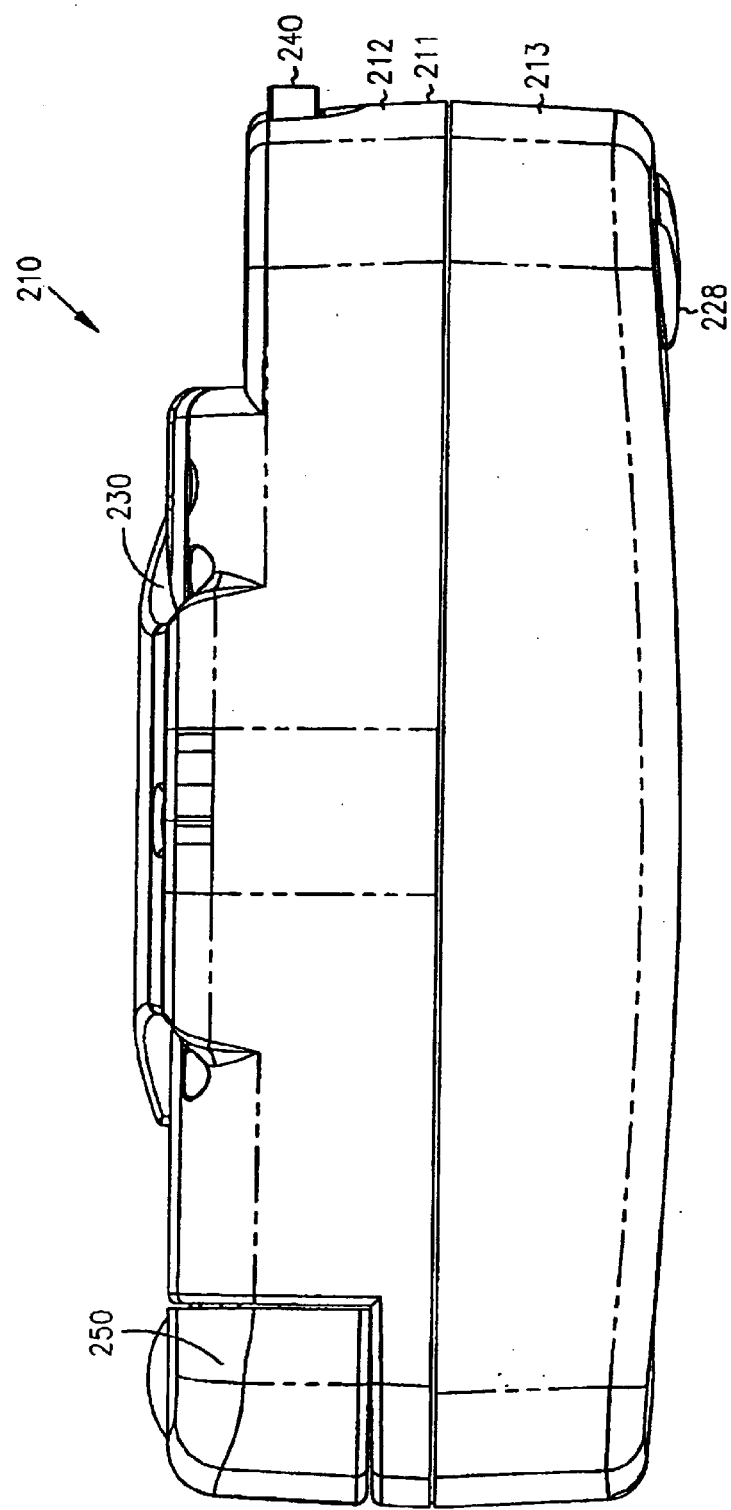
FIG. 2C illustrates a top view of an embodiment of a hand-held, electronic device shown in FIG. 2A.

FIG. 2C illustrates a top view of an embodiment of a hand-held, electronic device 210 shown in FIG. 2A. Again, FIG. 2C illustrates that the housing 212 includes a first half 211 and a second half 213. The openings 214 for the touch panel 220 and the display 200 are in the second half 213 of the housing 212. The control buttons 228 are also in the second half 213 of the housing 212. The first half 211 of the housing 212 includes a splash proof data card door 250. The splash proof data card door 250 seals with respect to the housing 212. The splash proof data card door 250 covers a slot for receiving a data card, such as compact flash, smart media, secure digital, or any other data source. The data card is used to store instruction sets for the electronics within the interior of the housing 212. The data card slot (not shown) is covered by the data card door 250 to prevent a leakage path to the interior of the housing 212. That is, the splash proof data card door 250 is sealed with respect to the first half 211 of the housing 212 to keep the hand-held, electronic device 210 waterproof.

Figure 2D:
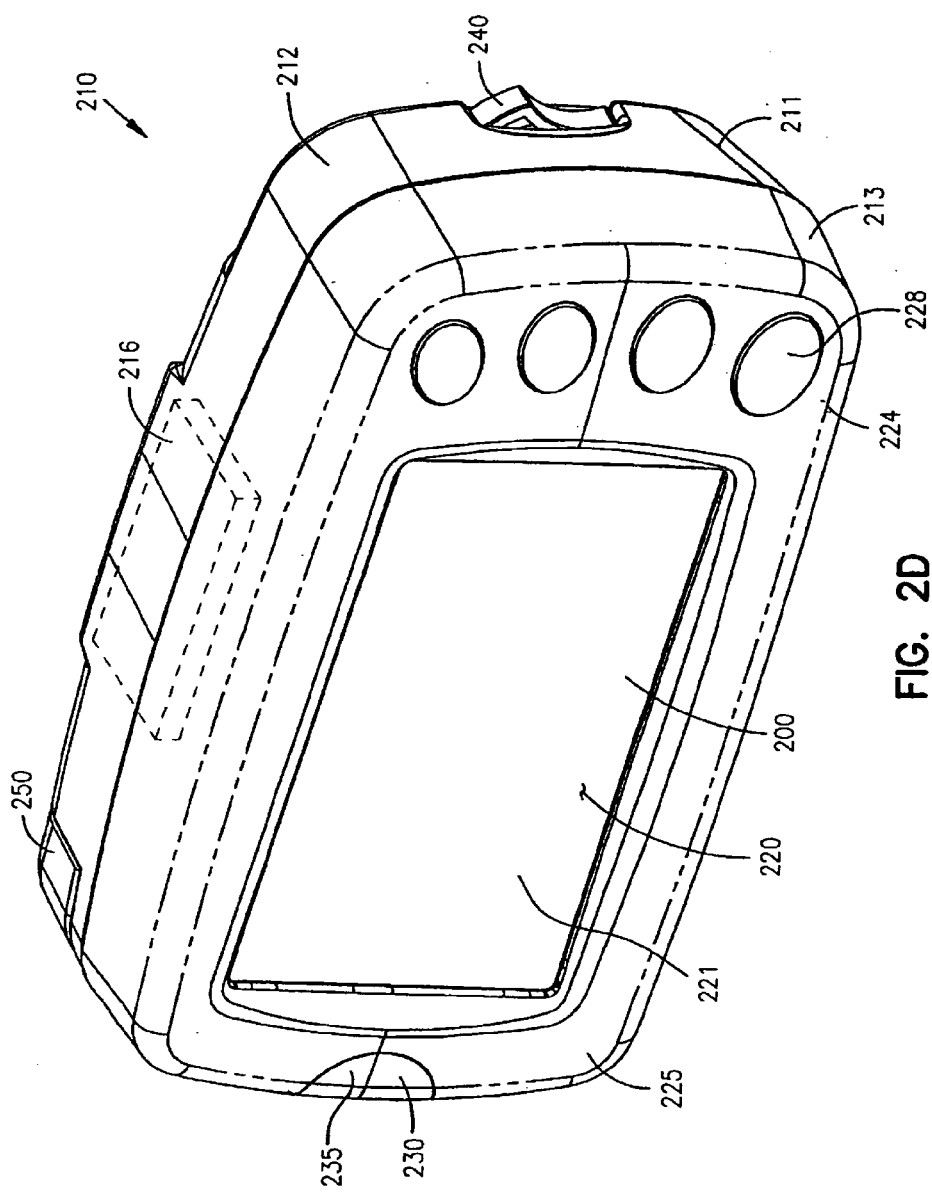
FIG. 2D illustrates a isometric view of an embodiment of a hand-held, electronic device shown in FIGS. 2A–2C.

FIG. 2D illustrates an isometric perspective view of an embodiment of a hand-held, electronic device 210 shown in FIGS. 2A–2C. The isometric view of the hand-held, electronic device 210 shows the positioning of the power switch 240, the splash proof data card door 250, the control buttons 228, the touch panel 220, the IRDA port 235 and the plate 230. It should be noted that the position of these various components can shift and still be within the scope of this invention.

FIGS. 3–9 are provided as illustrative examples of hardware embodiments for a portable, hand-held, electronic device that includes a navigational device according to the teachings of the present invention. It should be appreciated that other suitable designs for a hardware device would also be within the scope of the present invention.

Figure 3:
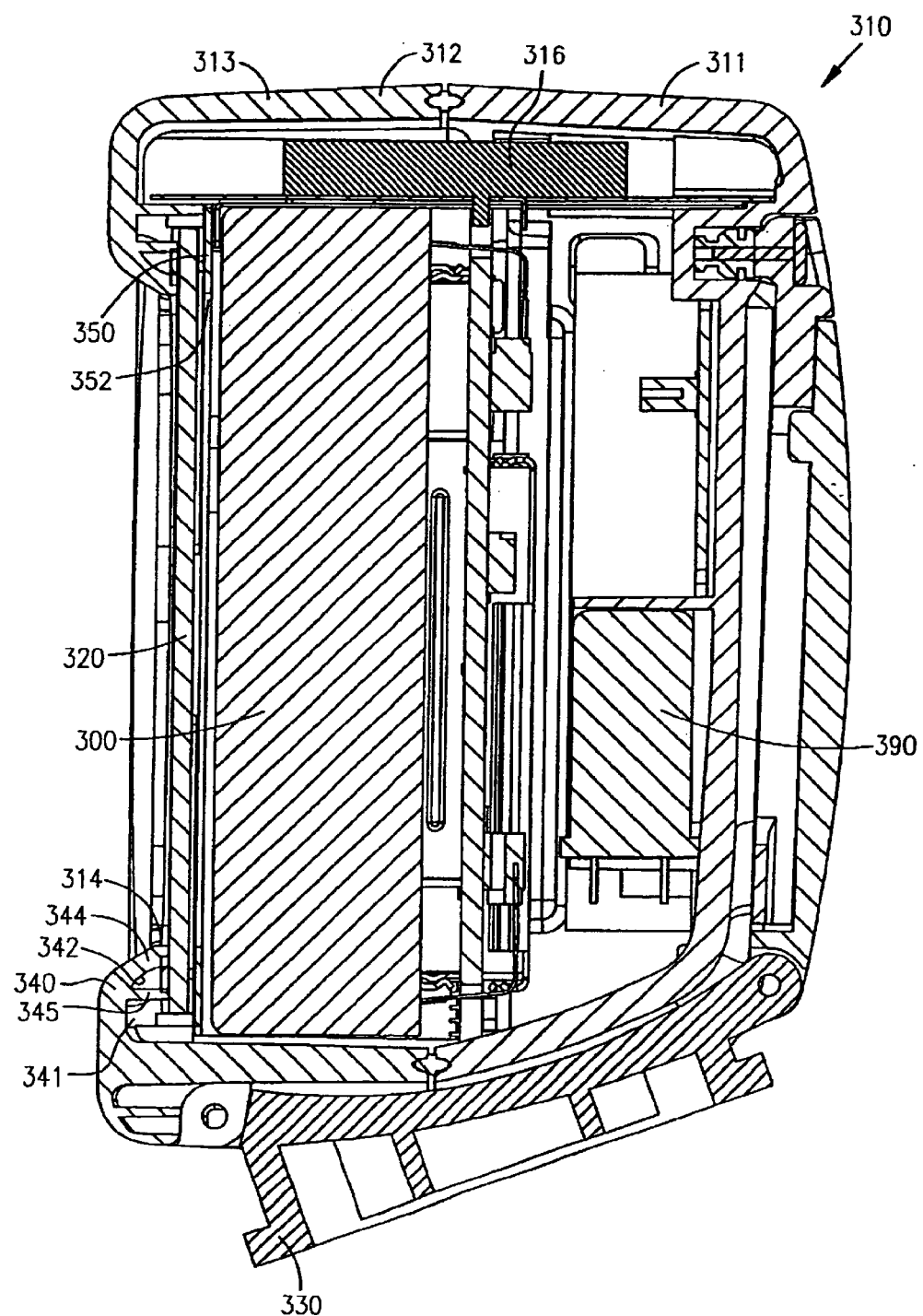
FIG. 3 illustrates a cross-section view along line 3—3 in FIG. 2 of the hand-held, electronic device.

FIG. 3 illustrates a cross-sectional view along line 3—3 in FIG. 2 of the hand-held electronic device 310. The portable hand-held electronic device 310 includes a housing 312 having an opening 314 in a second half 313 of the housing 312. The hand-held device has a touch panel 320 which is mounted and viewable through the opening 314. The touch panel 320 is transparent. The device 310 includes a display 300 mounted within the housing 312 and viewable through the touch panel 320. The housing also includes a patch antenna 316 which is positioned therein. In the embodiment shown in FIG. 3, the patch antenna is positioned along a top surface of the display 300. That is, the patch antenna 316 is positioned so that it is substantially horizontal with the plane of the earth when mounted within a vehicle using a plate 330. Also included within the housing 312 is an internal rate gyro 390 or other suitable dead-reckoning component. The internal rate gyro 390 is used for calculating routings when a navigational signal is lost.

Along the edge of the opening 314 is a mounting apparatus 340. The mounting apparatus 340 circumscribes the edge of the opening 314. The mounting apparatus 340 includes a first pocket 341 and a second pocket 342. The two pockets 341 and 342 form a first leg 344 and a second leg 345 which extend away from the front face or top of the housing 312 and specifically made integral with the second half 313 of the housing 312. The mounting apparatus 340 is molded with the rest of the housing 312 or made integral with the rest of the housing 312. The mounting apparatus is used to make a watertight seal around the touch panel 320. The mounting apparatus can also be used to provide a shock mount for the touch panel 320. The shock mount will be further detailed in FIGS. 7 and 8. The waterproof aspects of the mounting apparatus 340 will be further detailed in FIGS. 7–9.

Also included within the housing 312 is a backing bracket or backing plate 350. The backing bracket or backing plate 350 is mounted to the second half 313 of the housing 312 and is positioned near the edge of the touch panel 320. The backing plate has an opening 352 therein so that the backing plate 350 essentially forms a frame around the edge of the touch panel 320 to support the edge of the touch panel 320. The backing plate 350 is typically made of sheet metal, although it should be noted that other materials can be used in order to form the backing plate 350. In the embodiment shown in FIG. 3, the backing bracket or backing plate 350 fastens the touch panel 320 to a second half 313 of the housing 312.

Figure 4:
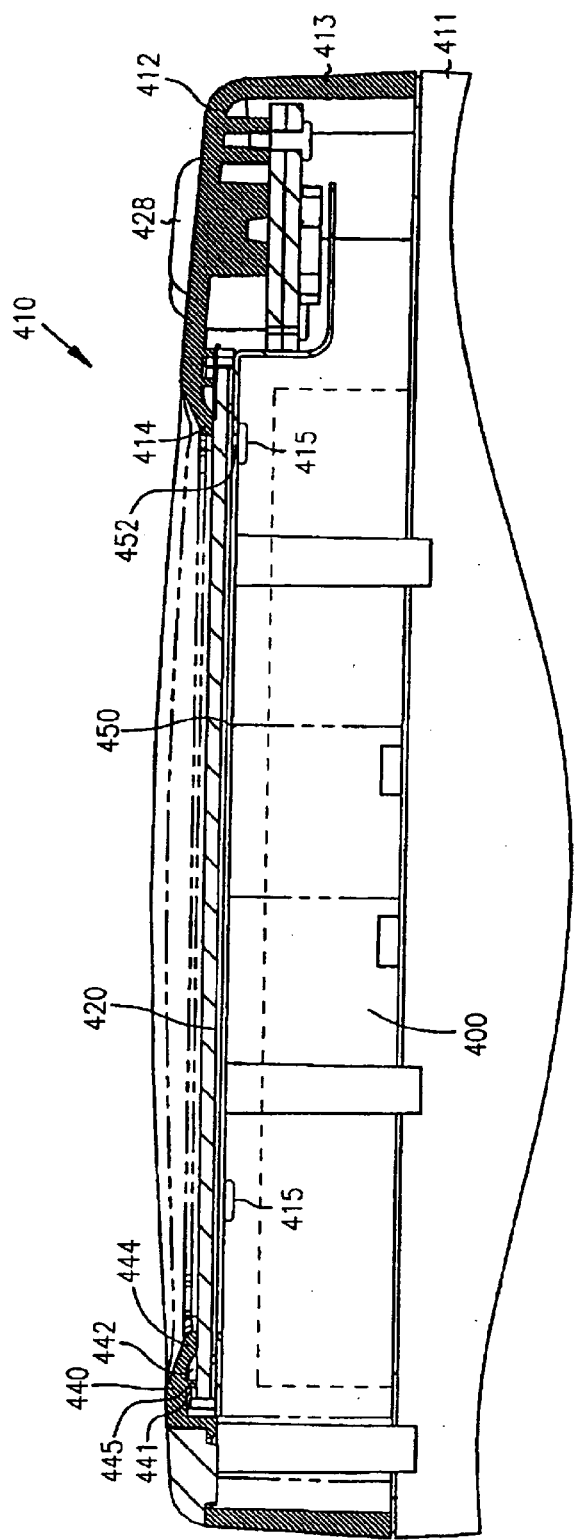
FIG. 4 illustrates a cross-section view along line 4—4 in FIG. 2 of the hand-held, electronic device.

FIG. 4 illustrates a cross-sectional view along line 4—4 in FIG. 2 of the hand-held electronic device 410. More specifically, FIG. 4 shows a cross sectional view of a second half 413 of the housing 412. FIG. 4 illustrates more clearly the mounting of the touch panel 420. A complete first half 411 of the housing 412 is not shown in FIG. 4 for the sake of clarity. The hand-held electronic device 410 includes the second half 413 of the housing 412 that has an opening 414 therein. The portable electronic hand-held device 410 also includes a touch panel 420. A mounting device or mounting apparatus 440 circumscribes the opening 414 and is used to mount the touch panel 420 within the opening 414 of the housing 412 so that it is viewable through the opening 414 while being waterproof. In some embodiments, the backing bracket or backing plate 450 fastens to the second half 413 of the housing 412. In some embodiments, the mounting apparatus 440 can include a shock mount portion. Situated near an interior major surface of the touch panel 420 is a backing plate 450. The backing bracket or backing plate 450 is typically made of sheet metal and includes an opening 452 therein. The backing bracket or backing plate frames the touch panel 420 on the interior side of one of the major surfaces of the touch panel 420. The backing bracket or backing plate 450 frames the touch panel 420 along the periphery of the touch panel 420 and provides support around the edges of the touch panel. The backing bracket or backing plate 450 is mounted to the second half 413 of the housing 412 via fasteners 415. In one embodiment, the fasteners include screws, or other suitable fasteners or the like. Also included within the housing 412 is a patch antenna. Although the patch antenna is not visible in FIG. 4, the patch antenna is operatively coupled to a printed circuit board which includes a microprocessor and a memory. Computer-executable instruction sets may be stored within the memory. The instruction set is used by the microprocessor to perform various calculations including route calculations. The patch antenna is operatively coupled to the microprocessor and the memory so that the patch antenna can acquire signals from GPS satellites or other positioning signals, such as RF signals and the like, to determine the location of the hand-held, portable electronic device 410. The processor and antenna are further discussed in FIGS. 10 and 11.

The patch antenna can also be used to receive all or a portion of the instruction set from a remote server or other communication device. In other words, in some embodiments the instruction set can be housed within the onboard microprocessor and onboard memory, and in other applications, some or all of the instruction set may be forwarded to the onboard microprocessor and onboard memory. Further details are discussed with respect to FIG. 12.

Figure 5:
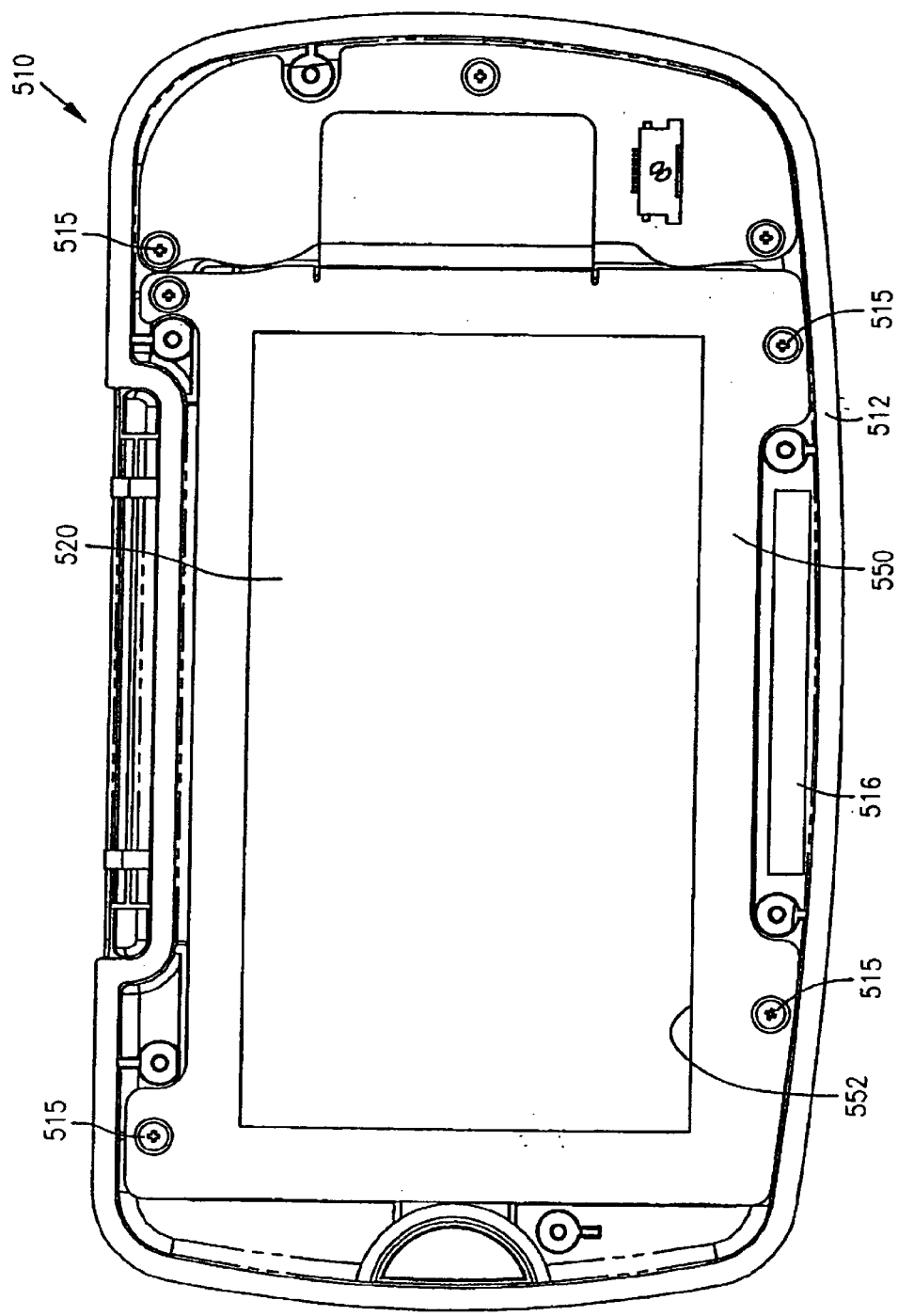
FIG. 5 is a front cut away view of the hand-held, electronic device shown in FIGS. 2–4.

FIG. 5 is a front cutaway view of the hand-held, electronic device 510 as shown in FIGS. 2–4. The portable, hand-held electronic device includes a housing 512. Attached to the housing 512 is the backing bracket or backing plate 550. The backing bracket has an opening therein 552. The backing bracket 550 is attached to the housing using fasteners 515. Also located within the housing is a patch antenna 516.

Figure 6:
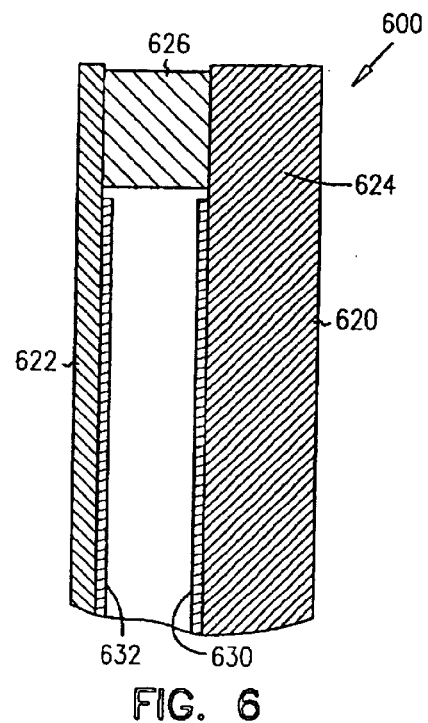
FIG. 6 is a cross-sectional view of a portion of the touch panel of the handheld, electronic device.

FIG. 6 is a cross-sectional view of a typical touch panel 620 of the handheld, electronic device. The touch panel 620 includes a thin, flexible film 622 which is positioned near a layer of rigid material 624. The thin film 622 and the rigid material 624 each have a layer of conductive material 630, 632, respectively, such as indium, tin, oxide printed on a major surface. When thin film 622 is deflected, the conductive material 632 touches the conductive material 630 to create a closed circuit. It should be noted that the touch panel 620 is not limited to the type of conductive film placed on the thin, flexible film 622 or the rigid material 624. A touch panel with any type of conductive film is contemplated by the invention. The layer of rigid material 624 is typically more rigid than the housing 212, 312, 412, 512 of the portable electronic device 210, 310, 410, 510. The thin, flexible film 622 is attached to the rigid backing layer 624 by an adhesive gasket 626. The adhesive gasket 626 keeps the thin, flexible film 622 separated from the rigid backing 624 of the touch panel 620. The rigid backing can be made of plastic or glass. Other materials can also be used. Glass seems to be the most commonly used rigid material 624. Therefore, the rigid material 624 needs to be shock-mounted with respect to the housing 212, 312, 412, 512, so that the portable, electronic, hand-held device 210, 310, 410, 510 is more rugged. The touch panel 220, 320, 420, 520, 720, 820, 920 shown in FIGS. 2–5, as well as in FIGS. 7–9, each have a similar structure as shown in FIG. 6. However for the sake of simplicity the touch panel 220, 320, 420, 520, 720, 820, 920, is merely shown as one solid block of material in FIGS. 2, 3, 4, 5, 7, 8 and 9. It should be noted, however, that even though the touch panel is shown as a solid block of material, it is actually a rigid backing 624 with a thin, flexible film 622 held away from the rigid backing by the adhesive gasket 626. By applying pressure to the touch panel with either a fingertip or a stylus, inputs and commands can be made to the portable electronic device. As mentioned previously, a major surface of the rigid material and a major surface of the flexible material are provided with an electrically conductive film so that when the flexible material is deflected to touch the rigid material a closed circuit indicating the location of the contact is formed.

Figure 7:
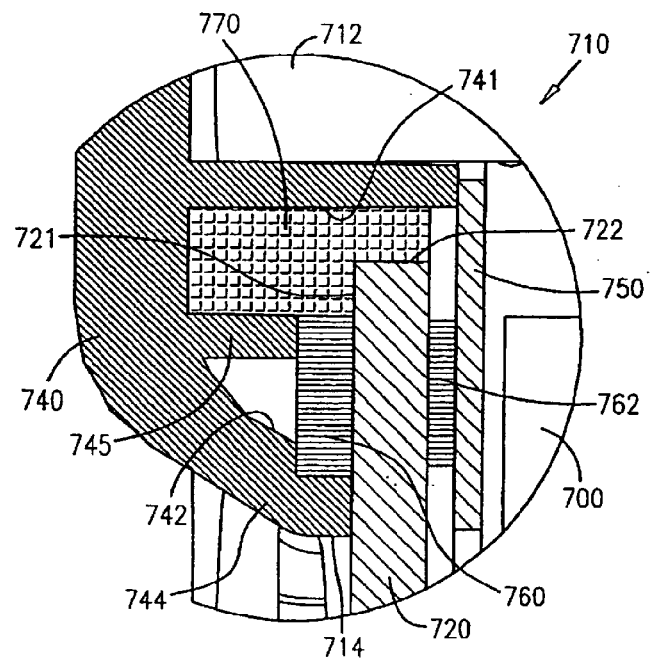
FIG. 7 is a cross-sectional view of the portion of the housing near the opening which details an embodiment for mounting the touch panel with respect to the housing of the hand-held, electronic device.

FIG. 7 is a cross-sectional view of a portion of the housing near the opening which details one embodiment for mounting the touch panel 720 with respect to the housing 712. The housing 712 includes the mounting apparatus 740. The mounting apparatus 740 includes a first pocket 741 and a second pocket 742. The mounting apparatus 740 includes a first leg 744 and a second leg 745. As shown in FIG. 7, the touch panel 720 is shock-mounted using a first viscoelastic shock mount member 760 and a second viscoelastic shock member 762. The first viscoelastic shock member 760 is sandwiched between an edge of the touch panel 720 and a portion of the first leg 744 and a portion of the second leg 745. As shown in FIG. 7, the bottom portion of the second leg 745 of the mounting apparatus is entirely covered to sandwich the first viscoelastic member 760 between the two legs 744, 745 of the mounting apparatus and the edge of the display 720. The second viscoelastic member 762 is sandwiched between the backing member 750 and the edge of the touch panel 720. The viscoelastic members 760, 762 can be made from a variety of materials, including foam tape which may have an adhesive backing. The viscoelastic elements or members 760, 762 can extend all the way around the periphery of the touch panel 720. It is not necessary, however, to have the viscoelastic members 760, 762 extend all the way around the periphery of the touch panel 720 in order to obtain an adequate shock mount to increase the drop resistance of the portable, hand-held, electronic device 210, 310, 410, 510.

Within the pocket 741 is a flexible adhesive 770. The flexible adhesive 770 fills the pocket 741 and can cover a portion of a major surface 721 of the touch panel and covers an edge 722 of the touch panel 720. The flexible adhesive 770 provides a moisture barrier which prevents moisture from passing from the exterior portion of the touch panel 720 to the interior of the housing 712. The flexible adhesive also serves as a shock mount. During a drop or other shock event, the flexible adhesive 770 flexes and cradles the edge of the touch panel 720. The flexible adhesive 770 is typically silicon and preferably is a room-temperature vulcanization ("RTV") silicon. It is important that the adhesive fill the entire pocket 741 around the whole periphery of the touch panel 720 and about the periphery of the mounting apparatus 740 near the opening 714 in the housing 712. In other words, the flexible adhesive 770 provides a moisture barrier around the entire edge of the touch panel 720 to prevent a leakage path from forming between the exterior surface of the touch panel 720 and the interior of the housing 712. Thus, the mounting apparatus 740 shown in FIG. 7 includes a flexible adhesive 770 which wraps around a portion of the major surface 721 of the display as well as the edge 722 of the touch panel 720. This flexible adhesive 770 goes around the entire periphery of the display and provides a moisture barrier to prevent leakage paths between the exterior surface of the touch panel 720 and the exterior of the housing 712 and the interior of the housing 712. The flexible adhesive 770 also acts as a shock mount, since the flexible adhesive flexes during a shock event or a drop. In addition, the mounting apparatus 740 includes a first viscoelastic pad 760 and a second viscoelastic pad 762. These can also ring the entire circumference or outer perimeter of the touch panel 720. It should be noted that the viscoelastic elements 760, 762 do not necessarily have to go all the way around the periphery of the display in order to be effective as shock mounts.

The touch panel 720 is mounted between the mounting apparatus 740 and the backing bracket 750. The touch panel 720 is transparent. Mounted within the housing 712 is display 700. The display 700 is viewable from the exterior of the housing 712 through the transparent touch panel 720.

Figure 8:
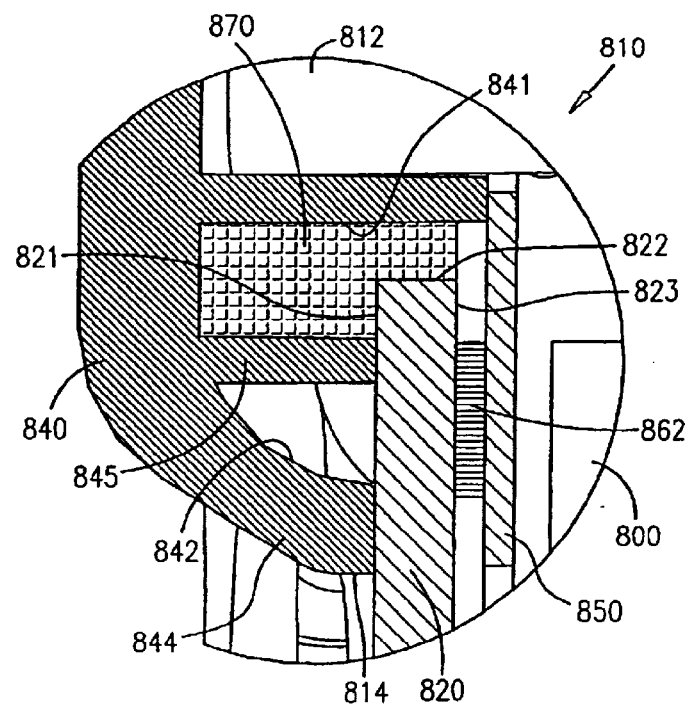
FIG. 8 is a cross-sectional view of the portion of the housing near the opening which details another embodiment for mounting the touch panel with respect to the housing of the hand-held, electronic device.

FIG. 8 is a cross-sectional view of a portion of the housing 812 near the opening 814 in the housing, which details another embodiment for mounting the touch panel 820 with respect to the housing 812 in the hand-held, electronic device 810. Near the opening 814 is a mounting apparatus 840 which includes a first pocket 841 and a second pocket 842. The pockets 841 and 842 result in a first leg 844 and a second leg 845. The legs 844 and 845 contact a major surface 821 of the touch panel 820. The major surface 821 corresponds to the portion of the touch panel 820 which is also exterior to the internal portion of the housing 812. Another major surface 823 faces the interior of the housing 812. A viscoelastic member 862 is sandwiched between a major surface 823 of the touch panel 820 and the backing bracket 850 which is mounted to the interior of the touch panel 820. The viscoelastic member 862 serves as a shock mount since the touch panel 820 typically includes a fragile or rigid element, such as a glass layer. The pocket 841 is filled with a flexible adhesive 870. The adhesive 870 also serves a shock absorbing function. The adhesive 870 can cover a portion of the major surface 821 of the touch panel 820 as well as the edge 822 of the touch panel 820. The flexible adhesive 870 is a silicon adhesive and produces a water barrier or moisture barrier between the interior of the housing 812 and the exterior of the housing 812 and touch panel 820. Therefore, the pocket 841 of the mounting apparatus 840 extends all the way around the edge of the touch panel 820 to prevent any leakage path from the exterior of the housing 812 to the interior of the housing. The viscoelastic member 862 may also extend completely around the circumference of the touch panel 820, or it may pass around certain portions at the circumference of the touch panel 820. The viscoelastic member 862, as well as the flexible adhesive 870, dampen any shock that may result from a drop or other shock event that may occur with respect to the housing 812 of the portable, hand-held, electronic device 810. The viscoelastic layer 862 can be any sort of material including a flexible tape or a foam tape that has an adhesive backing. The flexible adhesive 870 typically is a silicone and preferably, but not limited to, a RTV silicone, which vulcanizes at room temperature.

The touch panel 820 is mounted between the mounting apparatus 840 and the backing bracket 850. The touch panel 820 is transparent. Mounted within the housing 812 is display 800. The display 800 is viewable from the exterior of the housing 812 through the transparent touch panel 820.

Figure 9:
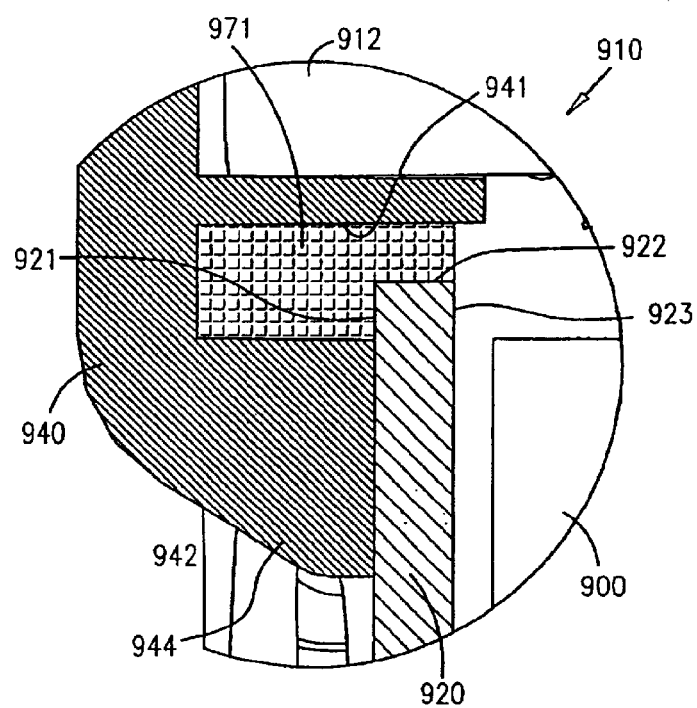
FIG. 9 is a cross-sectional view of the portion of the housing near the opening which details yet another embodiment for mounting the touch panel with respect to the housing of the hand-held, electronic device.

FIG. 9 shows yet another embodiment of the mounting apparatus for mounting the touch panel 920 with respect to the housing 912 of the hand-held, electronic device 910. In this particular hand-held, electronic device 910 there is no backing member such as that shown in FIGS. 2, 3, 4, 5, 7, and 8. In this particular instance, the mounting apparatus 940 includes a first pocket 941. There is no second pocket. Rather, the volume the mounting apparatus between a first leg 944 and a second leg 945 is solid plastic. A rigid adhesive 971 is placed in the pocket 941. The area between and including first leg 944 and the second leg 945 contact the major surface 921 of the touch panel 920 which includes an exterior portion. In this embodiment, this contact surface is maximized to evenly distribute any shock or force the touch panel 920 may experience. The rigid adhesive 971 is placed in the pocket. The rigid adhesive contacts the outside edge 922 of the touch panel 920. The rigid adhesive is preferably UV-cured so that it can be cured during manufacture. The rigid adhesive 971 then grips or holds the touch panel 920 by the portion contacting the major surface 921 and by the outside edge 922 of the touch panel 920. In this particular embodiment, the idea is to rigidly hold the touch panel 920 in place so that if a shock event should occur, there is relatively little if any motion between the touch panel 920 and the mounting apparatus 940 and the housing 912 of the hand-held, electronic, portable device 910. The rigid adhesive 971 which is in the pocket 941 is continuous around the lip or outer edge of the touch panel 920 and provides a moisture barrier to prevent leakage from the exterior to the interior of the housing 910.

The touch panel 920 is mounted to the mounting apparatus 940. The touch panel 920 is transparent. Mounted within the housing 912 is display 900. The display 900 is viewable from the exterior of the housing 912 through the transparent touch panel 920.

It should be noted that there may be additional moisture barriers put in place in addition to any of the adhesive barriers that are shown in FIGS. 7, 8, and 9. For example, a gasket could be placed on either of the first legs 844, 944 so that the gasket is sandwiched between the first leg 844, 944 and the touch panel 820, 920. Similarly, a gasket could be placed on the second leg 745, 845, 945 so that it is sandwiched between the bottom of the leg and the touch panel 720, 820, 920.

Figure 13:
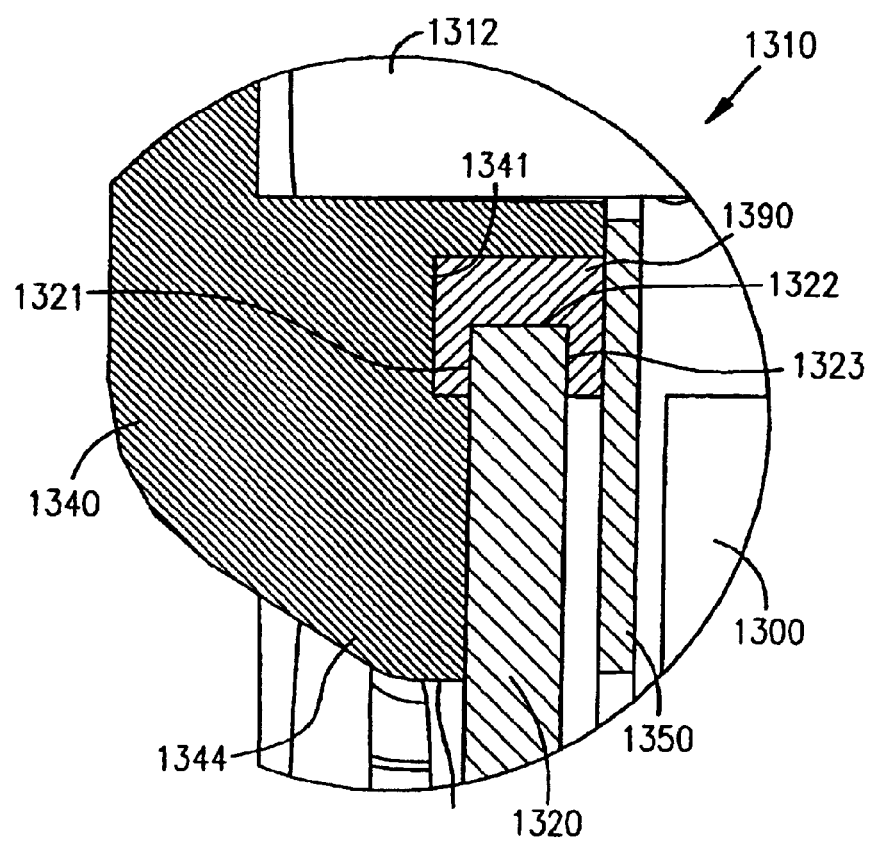
FIG. 13 is a cross-sectional view of the portion of the housing near the opening which details yet another embodiment for mounting the touch panel with respect to the housing of the hand-held, electronic device.

FIG. 13 is another embodiment of the mounting apparatus 1340 for mounting the touch panel 1320 with respect to the housing 1312 of a hand-held electronic device 1310. In this particular hand-held, electronic device 1310, a C-shaped gasket 1390 wraps around three surfaces of the edge of the touch panel 1320. The C-shaped gasket 1390 wraps around the edge 1322 of the touch panel 1320 and also contacts a portion of the first major surface 1321 and a portion of the second major surface 1323 of the touch panel 1320. The mounting apparatus 1340 is essentially a solid piece of plastic having a pocket 1341 therein. A portion of the C-shaped gasket 1390 fits within the pocket 1341 in the mounting member 1340. A backing bracket 1350 is also provided. The backing bracket 1350 compresses the gasket 1390 in a first direction. The touch panel 1320 is sized so that the gasket 1390 is also compressed in a second direction towards the housing 1312. In operation, no glue or adhesive is required to shock mount the touch panel 1320 and form a waterproof seal. The gasket 1390, when compressed by the outer edge 1322 of the touch panel 1320 and by the backing bracket 1350, provides both a shock mount and a water proof seal. The touch panel 1320 is mounted between the mounting apparatus 1340 and the backing bracket 1350. The touch panel 1320 is transparent. Mounted within the housing 1312 is a display 1300. The display 1300 is viewable from the exterior of the housing 1312 through the transparent touch panel 1320.

Figure 10:
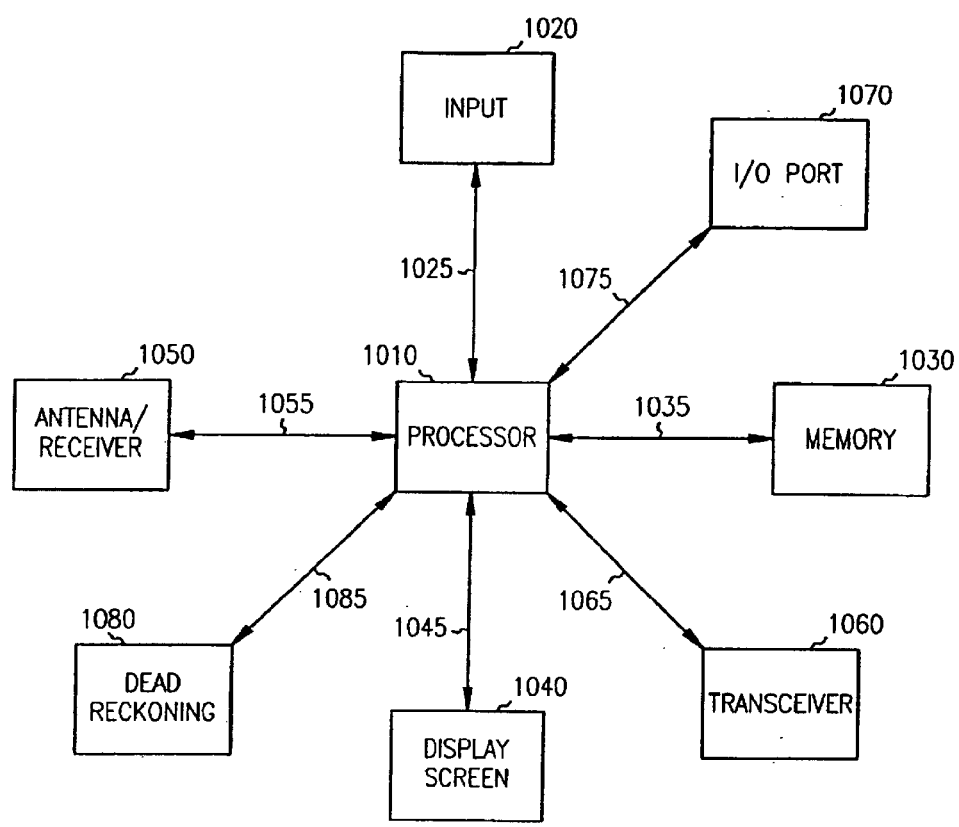
FIG. 10 is a block diagram of one embodiment for the electronic components within the hardware of FIGS. 2A–2D according to the teachings of the present invention.

FIG. 10 is a block diagram of one embodiment for the electronic components within the hardware of FIGS. 2A–2D, such as within housing 212 and utilized by the electronic navigational device. In the embodiment shown in FIG. 10, the electronic components include a processor 1010 which is connected to an input 1020, such as keypad, touch panel or infrared data acquisition port via line 1025. It will be understood that input 1020 can alternatively be a microphone for receiving voice commands. Processor 1010 communicates with memory 1030 via line 1035. Processor 1010 also communicates with display screen 1040 via line 1045. An antenna/receiver 1050, such as a GPS antenna/receiver is connected to processor 1010 via line 1055. It will be understood that the antenna and receiver, designated by reference numeral 1050, are combined schematically for illustration, but that the antenna and receiver may be separately located components, and that the antenna may be a GPS patch antenna or a helical antenna. The electronic components of shown in FIG. 10 include a transceiver 1060 which is coupled to the processor 1010 via line 1065. The electronic components include I/O ports 1070 connected to processor 1010 via line 1075. The I/O ports 1070 can include but are not limited to serial, digital, discrete, optoelectrical, or other I/O ports. The electronic components further include at least one dead reckoning component 1080 connected to the processor 1010 via line 1085. According to the teachings of the present invention, that at least one dead reckoning component 1080 includes, by way of example and not by way of limitation, a rate gyro as the same are known and understood by one of ordinary skill in the art. Examples of such a dead reckoning positioning functionality include, but are not limited to, the dead reckoning positioning hardware and algorithms as described in commonly assigned applications entitled; "Portable Navigation Device with Integrated GPS and Dead Reckoning Capabilities," application Ser. No. 10/184,844, and "Systems and Methods with Integrated GPS and Dead Reckoning Capabilities," application Ser. No. 10/184,373. The invention, however, is not so limited. One of ordinary skill in the art will appreciate, upon reading this disclosure, that other dead reckoning components suited to provide the advantages of the present invention are considered equally within the scope of the present invention.

Figure 11:
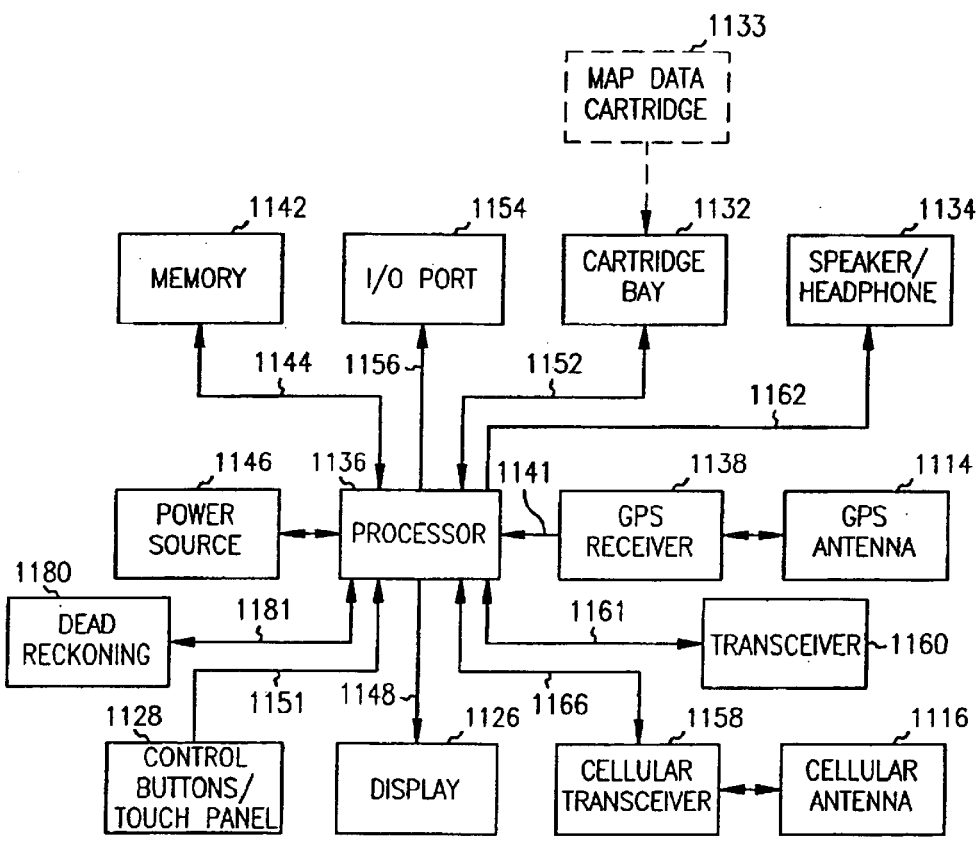
FIG. 11 is a block diagram of another embodiment for the electronic components within the hardware of FIGS. 2A–2D according to the teachings of the present invention.

FIG. 11 is a block diagram of another embodiment for the electronic components within the hardware of FIGS. 2A–2D according to the teachings of the present invention. In this particular embodiment, the electronics can include more than one function. One example of such a multifunctional device includes a device capable of a first function with global positioning and routing, and a second function, such as keeping addresses, calendars and files used for linking with another computer. The second function or set of functions are commonly associated with a personal data assistant ("PDA"). It should be noted that the second function could be a multitude of other functions and is not limited to the functions commonly associated with a PDA. For example, the other function could be a cellular phone, or any other portable electronic computing device. It should be noted that the electronic device could also include more than two different functions. The electronic components shown in FIG. 11 include a processor 1136 which is connected to the GPS antenna 1114 through GPS receiver 1138 via line 1141. The processor 1136 interacts with an operating system (such as PalmOS; Pocket PC) that runs selected software depending on the intended use of the electronics, such as software for driving a PDA, cellular phone, or other hand held device. Processor 1136 is coupled with memory 1142 such as RAM via line 1144, and power source 1146 for powering the electronic components. The processor 1136 communicates with a display, 1126 via data line 1148.

The electronic components further include two other input sources that are connected to the processor 1136. Control buttons and the touch panel 1128 are connected to processor 1136 via line 1151 and a map data cartridge 1133 inserted into cartridge bay 1132 is connected via line 1152. An I/O port 1154 is connected to the processor 1136 via line 1156. Cellular antenna 1116 is connected to cellular transceiver 1158, which is connected to the processor 1136 via line 1166. Processor 1136 is connected to the speaker/headphone jack 1134 via line 1162. The multifunction electronic device may also include an infrared port (not shown) coupled to the processor 1136 that may be used to beam information from one electronic device to another electronic device. The same will be explained in more detail below.

According to the teachings of the present invention, and as shown in the embodiments of FIGS. 10 and 11, the electronic components of the present invention include a memory, shown as 1142 in FIG. 11, which is adapted to store and/or house a set of executable instructions, programs, and/or program modules. For ease of illustration, the memory will be discussed in reference to FIG. 11 where the memory 1142 is coupled to the processor 1136 via line 1144. The description, however, applies analogously to the memory 1030 in FIG. 10. As one of ordinary skill in the art will appreciate, the memory 1142 is adapted to communicate with the processor 1136. In the invention, the memory 1142 is further adapted to store or house navigation related data and is adapted to house or store software operable to perform routing algorithms. Examples of such routing algorithms include, but are not limited to, routing algorithms as described in commonly assigned applications entitled; "Systems and Methods for a Navigational Device with Improved Route Calculation Capabilities," application Ser. No. 10/028,057, now U.S. Pat. No. 6,545,637, "Systems and Methods for a Navigational Device with Forced Layer Switching Based on Memory Constraints," application Ser. No. 10/027,159, now U.S. Pat. No. 6,581,003, "Systems and Methods for a Navigational Device with Automated Next Turn Page," application Ser. No. 10/029,917, "Navigation System, Method and Device with Voice Guidance", application Ser. No. 10/029,732, and "Navigation System, Method and Device with Detour Algorithm", application Ser. No. 10/028,343, now U.S. Pat. No. 6,687,615, each of which is incorporated herein in full by reference.

According to the teachings of the present invention, the navigation related data includes cartographic data. The cartographic data includes a number of locations and data indicative of thoroughfares of a plurality of types connecting certain ones of the locations. In one embodiment, the navigation related data includes a calculated route between at least two of the number of locations. Further, according to the teachings of the present invention, the software stored or housed within memory 1142 includes software operable to perform one or more applications for navigation. As used herein, software operable to perform one or more applications for navigation includes, but is not limited to, software operable to find points of interest. In one embodiment, the navigation related data includes navigation data selected from the group of a number of waypoints, a planned route, and points of interest. In one embodiment, the points of interest include points of interest selected from the group of geographical points of interest, entertainment venues, dining venues, historical points of interest, and lodging venues. In one embodiment, the navigation related data includes navigation data selected from the group of automobile navigation data, marine craft navigation data, pedestrian navigation data, and hiking navigation data.

In one embodiment, the device is GPS enabled. In this embodiment, the software is operable to calculate an estimated time of arrival of the device to the a desired destination using an integrated GPS capability of the device.

According to the teachings of the present invention, and as shown in the embodiments of FIGS. 10 and 11, the electronic components of the present invention include a transceiver shown as 11160, which is coupled to the processor. For ease of illustration, the transceiver 1160 will be discussed in reference to FIG. 11 where the transceiver 1160 is coupled to the processor 1136 via line 1161. The description, however, applies analogously to the electronic components shown in FIG. 10. As stated above, the memory is adapted to store or house software. According to the teachings of the present invention, software is provided which includes a set of executable instructions, programs, and or program modules adapted to control transceiver 1160 such that the transceiver 1160 can transmit and receive navigation data between a handheld electronic device and an other portable and/or handheld device. For example, in one embodiment, the software includes a set of executable instructions adapted to transmit and receive the navigation related data via a commercial communications network.

One example of a commercial communications network includes an analog cellular network using plain old telephone service (POTS). Another example of a commercial communications network to which the present invention is adapted includes a digital packet switched cellular network such as a personal communications service (PCS) network. As one of ordinary skill in the art will understand upon reading this disclosure, the transceiver 1060, 1160 of the present invention is adapted to transmit and receive navigation related data via the Internet using Internet Protocol (IP). Thus, the present invention includes a handheld electronic device which is adapted to transmit and receive navigation related data over a wide area network (WAN) using any number or combination of hardwired and/or wireless communication channels. For instance, the transceiver of the present invention is adapted to transmit and receive navigation related data using a wireless application protocol (WAP). However, as one of ordinary skill in the art will understand upon reading and comprehending this disclosure, the invention is not limited to single one or particular combination of WAN communication channels or protocols. That is the transceiver can be instructed to transmit and receive navigation related data in a 3G GSM/CDMA network, and other networks of the like.

Similarly, according to the teachings of the present invention, the transceiver 1060, 1160 is adapted to transmit and receive navigation related data over a local area network (LAN). In this embodiment, the transceiver 1060, 1160 is adapted to operate in a short range network and wirelessly transmit and receive the navigation related data between a handheld electronic device and an other portable and/or handheld electronic device using either infra-red signaling and/or a Bluetooth signaling technology as the same are known and understood by one of ordinary skill in the art. The invention is not so limited. As one of ordinary skill in the art will understand upon reading this disclosure, the electronic devices described herein include multipurpose devices, such as PDAs, cell phones and other intelligent appliances/apparel of the like, which can wirelessly transmit navigation related data from one such device to another. That is, in one embodiment, according to the teachings of the present invention, the handheld electronic device includes devices selected from the group of cell phones, intelligent apparel, and PDAs. In one embodiment, the other portable and/or handheld electronic device similarly includes devices selected from the group of cell phones, intelligent apparel, and PDAs.

According to the teachings of the present invention, and as shown in the embodiments of FIGS. 10 and 11, the electronic components of the present invention include a dead reckoning component shown as 1180 which is coupled to the processor 1010, 1130. For ease of illustration, the dead reckoning component 1080, 1180 will be discussed in reference to FIG. 11 where the dead reckoning component 1180 is coupled to the processor 1136 via line 1181. The description, however, applies analogously to the electronic components shown in FIG. 10. As stated above, the memory is adapted to store or house software. According to the teachings of the present invention, software is provided which includes a set of executable instructions, programs, and or program modules adapted to control the dead reckoning component 1180 such that the dead reckoning component 1180 can be activated and provide navigation services to the device.

As identified herein, the present invention provides a portable electronic device which includes both a triangulation positioning and a dead reckoning positioning functionality. In one embodiment, the triangulation positioning functionality includes a GPS functionality and the dead reckoning functionality includes a rate gyro. Examples of such a triangulation positioning and a dead reckoning positioning functionality include, but are not limited to, the triangulation positioning and a dead reckoning positioning hardware and algorithms as described in commonly assigned applications entitled; "Portable Navigation Device with Integrated GPS and Dead Reckoning Capabilities," application Ser. No. 10/184,844, and "Systems and Methods with Integrated GPS and Dead Reckoning Capabilities," application Ser. No. 10/184,373. The invention, however, is not so limited. In the invention, the processor of the device is adapted to operate on a set of computer executable instructions to determine, or resolve, a position of the device when the triangulation positioning service and/or signals are available. The processor of the device further adapted to operate on the set of computer executable instructions to determine, or resolve, a position of the device using the dead reckoning functionality to supplement the triangulation positioning functionality when the triangulation positioning functionality is interrupted, degraded, or otherwise unavailable. In this manner the present invention allows for the device to continue processing and/or tracking a location or position of the device when such triangulation positioning services are interfered with such as in "urban canyons" or when the device is indoors. Similarly, device can thus continue navigating a route for the device as the same is described herein.

As shown in FIGS. 10 and 11, the device further includes a touch panel in communication with the processor and the memory, e.g. touch panel portion of 1128 in FIG. 11. The display is adapted to display all or part of a "convergence" and/or a "solution." As used herein, the terms convergence and/or solution are intended to mean a complete path provided by the thoroughfares of a plurality of types connecting certain ones of the number of locations in the cartographic data.

Figure 12:
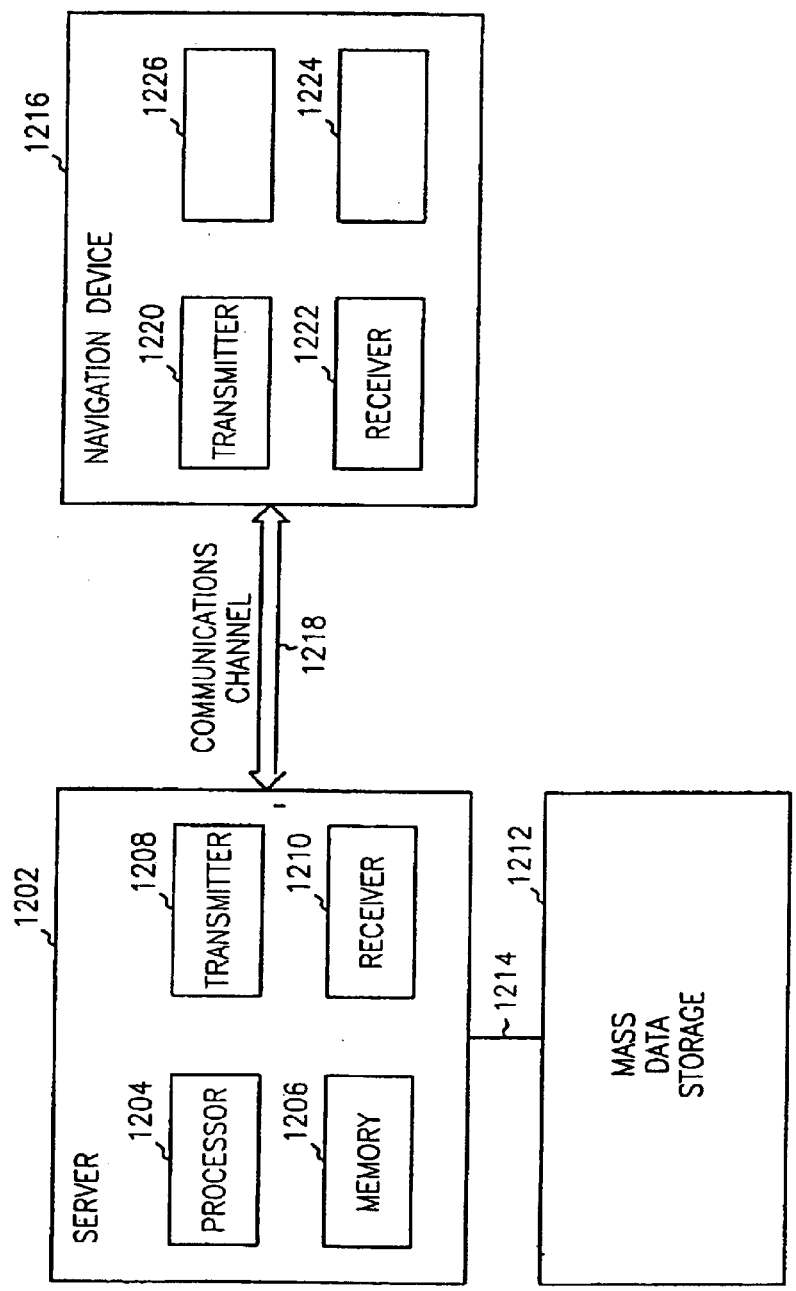
FIG. 12 is a block diagram of a navigation system according to the teachings of the present invention.

FIG. 12 is a block diagram of an embodiment of a navigation system according to the teachings of the present invention. The navigation system includes a server 1202. According to one embodiment, the server 1202 includes a processor 1204 operably coupled to memory 1206, and further includes a transmitter 1208 and a receiver 1210 to send and receive communication signals. The transmitter 1208 and receiver 1210 are selected or designed according to the communication requirements and the communication technology used in the communication design for the navigation system. The functions of the transmitter 1208 and the receiver 1210 can be combined into a single transceiver.

The navigation system further includes a mass data storage 1212 coupled to the server 1202 via communication link 1214. The mass data storage 1212 contains a store of navigation data. One of ordinary skill in the art will understand, upon reading and comprehending this disclosure, that the mass data storage 1212 can be separate device from the server 1202 or can be incorporated into the server 1202.

The navigation system further includes a navigation device 1216 adapted to communicate with the server 1202 through the communication channel 1218. According to one embodiment, the navigation device 1216 includes a processor and memory, as previously shown and described with respect to the block diagrams of FIGS. 10 and 11. Furthermore, the navigation device 1216 includes a transmitter 1220 and receiver 1222 to send and receive communication signals through the communication channel 1218. The transmitter 1220 and receiver 1222 are selected or designed according to the communication requirements and the communication technology used in the communication design for the navigation system. The functions of the transmitter 1220 and receiver 1222 can be combined into a single transceiver.

Software stored in the server memory 1206 provides instructions for the processor 1204 and allows the server 1202 to provide services to the navigation device 1216. One service provided by the server 1202 involves processing requests from the navigation device 1216 and transmitting navigation data from the mass data storage 1212 to the navigation device 1216. According to one embodiment, another service provided by the server 1202 includes processing the navigation data using various algorithms for a desired application, and sending the results of these calculations to the navigation device 1216.

The communication channel 1218 is the propagating medium or path that connects the navigation device 1216 and the server 1202. According to one embodiment, both the server 1202 and the navigation device 1216 include a transmitter for transmitting data through the communication channel and a receiver for receiving data that has been transmitted through the communication channel.

The communication channel 1218 is not limited to a particular communication technology. Additionally, the communication channel 1218 is not limited to a single communication technology; that is, the channel 1218 can include several communication links that use a variety of technology. For example, according to various embodiments, the communication channel is adapted to provide a path for electrical, optical, and/or electromagnetic communications. As such, the communication channel includes, but is not limited to, one or a combination of the following: electrical circuits, electrical conductors such as wires and coaxial cables, fiber optic cables, converters, radio-frequency (RF) waveguides, the atmosphere, and empty space. Furthermore, according to various embodiments, the communication channel includes intermediate devices such as routers, repeaters, buffers, transmitters, and receivers, for example.

In one embodiment, for example, the communication channel 1218 includes telephone and computer networks. Furthermore, in various embodiments, the communication channel 1216 is capable of accommodating wireless communication such as radio frequency, microwave frequency and infrared communication, and the like. Additionally, according to various embodiments, the communication channel 1216 accommodates satellite communication.

The communication signals transmitted through the communication channel 1218 include such signals as may be required or desired for a given communication technology. For example, the signals can be adapted to be used in cellular communication technology, such as time division multiple access (TDMA), frequency division multiple access (FDMA), code division multiple access (CDMA), global system for mobile communications (GSM), and the like. Both digital and analog signals can be transmitted through the communication channel 1218. According to various embodiments, these signals are modulated, encrypted and/or compressed signals as can be desirable for the communication technology.

The mass data storage includes sufficient memory for the desired navigation application. Examples of mass data storage include magnetic data storage media such as hard drives, optical data storage media such as CD ROMs, charge storing data storage media such as Flash memory, and molecular memory. Moreover, as one skilled in the art will readily appreciate the mass storage need not be a single device as a plurality of storage devices can be logically associated to form a distributed mass storage device of the present invention.

According to one embodiment of the navigation system, the 1202 server includes a remote server accessed by the navigation device 1216 through a wireless channel. According to other embodiments of the navigation system, the server 1202 includes a network server located on a local area network (LAN), wide area network (WAN), a virtual private network (VPN) and server farms.

According to another embodiment of the navigation system, the server 1202 includes a personal computer such as a desktop or laptop computer. In one embodiment, the communication channel 1218 is a cable connected between the personal computer and the navigation device. According to one embodiment, the communication channel 1218 is a wireless connection between the personal computer and the navigation device 1216.

FIG. 12 presents yet another embodiment for a collective set of electronic components adapted to the present invention. As one of ordinary skill in the art will understand upon reading this disclosure, the navigation system of FIG. 12 is adapted to the present invention in a manner distinguishable from that described and explained in detail in connection with FIGS. 10 and 11.

The mass storage device 1212 connected to the server can include volumes more cartographic and route data than that which is able to be maintained on the navigational device 1216 itself. In this embodiment, the server 1202 processes the majority of a user's travel along the route using a set of processing algorithms and the cartographic and route data stored in memory 1212 and can operate on signals, e.g. GPS signals, originally received by the navigational device 1216. Similar to the navigational device of FIGS. 2–11, the navigation device 1216 in system 1200 is outfitted with a display 1224 and GPS capabilities 1226.

It should be noted that the electronic components of device shown in FIGS. 2–11 and components of the system 1200 shown in FIG. 12 can be embodied as computer hardware circuitry or as a computer-readable program, or a combination of both. In another embodiment, system 1200 is implemented in an application service provider (ASP) system.

More specifically, in the computer-readable program embodiment, the programs can be structured in an object-orientation using an object-oriented language such as Java, Smalltalk, C++, and others, and the programs can be structured in a procedural-orientation using a procedural language such as C, PASCAL, and others. The software components communicate in any of a number of means that are well-known to those skilled in the art, such as application program interfaces (A.P.I.) or interprocess communication techniques such as remote procedure call (R.P.C.), common object request broker architecture (CORBA), Component Object Model (COM), Distributed Component Object Model (DCOM), Distributed System Object Model (DSOM) and Remote Method Invocation (RMI).

Of course it is readily appreciated by those skilled in the art that any programming methodology, programming language, programming interface, operating system, or computing environment, now known or hereafter developed can be readily deployed, without departing from the tenets of the present invention and all such implementation specific embodiments are intended to fall within the broad scope of the present invention.

CONCLUSION

In summary, disclosed is a hand-held portable electronic device including a housing, a processor located within the housing, a memory in communication with the processor, and a display in communication with the processor. The display is positioned near the surface of the housing. A touch panel is placed over the display and is mounted to an opening within the housing. The touch panel is in communication with the processor and positioned on a surface of the housing. The electronic device can include an apparatus for performing a first function, and an apparatus for performing a second function. One of the functions includes a navigational component. The housing includes a flange around the opening which has a fluid seal to prevent fluid flow past the touch panel and into the housing. A shock mount may also be included within the housing to make the touch panel drop-resistant. The electronic device includes a navigational component having an instruction set for controlling the processor and memory to perform a route calculation. The electronic device may also communicate with a mass storage device adapted to store navigation data and a server adapted to communicate with the mass storage. The electronic device may also be multi-functional. The handheld device is ruggedized and waterproofed and can be used in many environments.

The hand-held, portable, electronic device is also provided with hardware and software for performing dead reckoning in the event one or more signals necessary to determine a position is lost. The portable, hand-held, electronic device is also capable of auto-routing and performing other navigational functions.

The above systems, devices and methods have been described, by way of example and not by way of limitation, with respect to reducing memory capacity requirements, increasing processor throughput, and improving overall ease of user interaction with a navigation device. That is, the systems, devices, functional data, and methods provide for generating a projected route in connection with a navigational device which is more efficient and accurate than current systems, devices, and methods, without requiring more expensive system resources. The systems, devices, functional data, and methods of the present invention offer an improved generated projected route which provide more understandable, accurate and timely capabilities in a navigation device while utilizing less resources.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. It is to be understood that the above description is intended to be illustrative, and not restrictive. Combinations of the above embodiments, and other embodiments will be apparent to those of skill in the art upon reviewing the above description. The scope of the invention includes any other applications in which the above systems, devices, functional data, and methods are used. The scope of the invention should be determined with reference to the appended claims, along with the full scope of equivalents to which such claims are entitled.

What is claims is:

1. A hand-held electronic device including a navigational component, comprising:
    a housing, the housing having an opening therein;
    a display viewable through a touch panel mounted in the opening of the housing, the touch panel including:
        a layer of rigid material; and
        a flexible substrate layer positioned near the layer of rigid material;
    a mounting member circumscribing the opening for use in providing a watertight seal, the mounting member including:
        a first leg positioned away from a top of the housing and attached to a first shack absorbing member; and
        a second leg positioned away from the top of the housing and attached to the first shock absorbing member and an adhesive.

2. The hand-held electronic device including a navigational component of claim 1 wherein the adhesive is a flexible adhesive.

3. The hand-held electronic device including a navigational component of claim 1 wherein the adhesive is a flexible, waterproof adhesive.

4. The hand-held electronic device including a navigational component of claim 1, wherein the adhesive is curable using an ultraviolet light.

5. The hand-held electronic device including a navigational component of claim 1, wherein the adhesive is rigid.

6. The hand-held electronic device including a navigational component of claim 1, wherein the first shock absorbing member includes a viscoelastic material.

7. The hand-held electronic device including a navigational component of claim 6, wherein the first shock absorbing member includes a layer of foam material.

8. The hand-held electronic device including a navigational component of claim 1, further comprising:
    a backing member that fits within the housing, the backing member having a portion positioned near the touch panel; and
    a second shock absorbing member opposite the first shock absorbing member and including a portion which is sandwiched between the backing member and the layer of rigid materiel of the touch panel.

9. The hand-held electronic device including a navigational component of claim 1, wherein the mounting member is molded with the housing.

10. The hand-held electronic device including a navigational component of claim 1, wherein the mounting member is integral with the housing.

11. A hand-held electronic device including a navigational component comprising:
    a housing, the housing having an opening therein;
    a display viewable through a touch panel positioned in the opening of the housing, the touch panel including:
    a layer of rigid material; and
    a flexible substrata layer positioned near the layer of rigid material;
    a mounting member circumscribing the opening, the mounting member including a pocket for holding an adhesive and applying the adhesive about the periphery of the touch panel;
    a processor located within the housing;
    a memory in communication with the processor, the touch panel in communication with the processor and the memory, the processor and memory capable of performing a route calculation viewable on the display; and
    a fluid seal securing the touch panel to the housing, the fluid seal being disposed in front of the periphery of and around an outer edge of the touch panel and compressed toward the mounting member by a backing bracket to provide a water proof seal and a shock mount.

12. The hand-held electronic device including a navigational component of claim 11, further comprising a device capable of performing a dead reckoning calculation.

13. The hand-held electronic device including a navigational component of claim 12, wherein the device capable of performing a dead reckoning calculation includes a rate gyro.

14. A hand-held electronic device comprising:
a housing, the housing having an opening therein:
a processor located within the housing;
a memory located within the housing, the memory in communication with the processor;
a display in communication with the processor and the memory, the display viewable through a touch panel mounted in the opening in the housing;
a first component adapted to perform a first function; and
a second component adapted to perform a second function, one of the first component and the second component including a navigational component, the navigational component including a dead reckoning component located within the housing, the dead reckoning component in communication with the processor and operable to detect a position of the hand-held electronic device when GPS signals are unavailable and an internal patch antenna adapted to acquire position signals, the housing including a flange around the opening in the housing, the flange further comprising:
a fluid seal to prevent fluid flow past the touch panel and into the housing; and
a shock mount.

15. The hand-held electronic device of claim 14, wherein the touch panel further comprises:
a layer of rigid material; and
a flexible substrate layer positioned near the layer of rigid material.

16. The hand-held electronic device of claim 14, further comprising an instruction set for controlling the processor and memory to perform a route calculation.

17. The hand-held electronic device of claim 14, further comprising an instruction set for controlling the processor and memory to perform a route calculation, the instruction set including user interface instructions to display the results of the route calculation on the display.

18. The hand-held electronic device of claim 14, wherein the mounting member includes a flexible adhesive.

19. The hand-held electronic device of claim 18, wherein the mounting member includes a groove for holding the flexible adhesive.

20. The hand-held electronic device of claim 14, wherein the fluid seal includes a gasket.

21. The hand-held device of claim 14, wherein the shock mount includes a viscoelastic material.

22. A navigation system comprising:
a mass storage device adapted to store navigation data;
a server adapted to communicate with the mass storage device; and
a portable, multi-function electronic device further comprising:
a housing having an opening therein;
a processor located within the housing;
a memory located within the housing, the memory in communication with the processor;
a display in communication with the processor and the memory, the display viewable through a touch panel mounted to the opening in the housing, the housing including a flange around the opening in the housing, the flange further comprising:
a fluid seal securing the touch panel to the housing, the fluid seal being compressed in a first direction by the touch panel and in a second direction by a backing bracket such that fluid flow past the touch panel and into the housing is prevented; and
a shock mount; and
an antenna within the housing for communicating with the server, the multi-function electronic device including a navigation device adapted to perform a route calculation.

23. The navigation system of claim 22, wherein the navigation device further comprises en instruction set for controlling the processor and memory to perform a route calculation.

24. The navigation system of claim 23, wherein the instruction set includes user interface instructions for displaying the results of the route calculation on the display.

25. The navigation system of claim 23, wherein at least a portion of the instruction sot is resides within the processor and memory.

26. The navigation system of claim 23, wherein at least a portion of the instruction set is transmitted to the portable, multi-function electronic device from the server.

27. A hand-held electronic device including a navigational component, comprising:
a housing, the housing having an opening therein;
a display viewable through a touch panel mounted in the opening of the housing, the touch panel including:
a layer of rigid material, and
a flexible substrate layer positioned near the layer of rigid material;
a mounting member circumscribing the opening for use in providing a watertight seal, the mounting member including:
a first leg positioned away from a top of the housing and attached to a first shock absorbing member, and
a second leg positioned away from the top of the housing and attached to the first shock absorbing member and an adhesive;
a backing member that fits within the housing, the backing member having a portion positioned near the layer of rigid material of the touch panel;
the first shock absorbing member including a portion which is sandwiched between the flexible member of the touch panel and the mounting member; and
a second shock absorbing member including a portion which is sandwiched between the backing member and the layer of rigid material of the touch panel.

28. A hand-held electronic device including a navigational component, comprising:
a housing, the housing having art opening therein;
a display viewable through a touch panel mounted in the opening of the housing, the touch panel including:
a layer of rigid material, and
a flexible substrate layer positioned near the layer of rigid material;
a mounting member circumscribing the opening for use in providing a watertight seal, the mounting member including:
a leg positioned away from the top of the housing and attached to a first shock absorbing member and an adhesive, and
wherein the first shock absorbing member is pressed against the flexible layer of the touch panel;
a backing member that fits within the housing, the backing member having a portion positioned near the layer of rigid materiel of the touch panel;
a second shock absorbing member including a portion which is sandwiched between the backing member and the layer of rigid material of the touch panel; and
wherein the adhesive is disposed along a periphery of the flexible layer and around an outer edge of the layer of rigid material the touch panel to provide a water proof seal and a shock mount.

* * * * *